United States Patent
Skinner et al.

(10) Patent No.: US 11,697,218 B2
(45) Date of Patent: Jul. 11, 2023

(54) CONTROL OF A CUTTING TOOL

(71) Applicant: Milwaukee Electric Tool Corporation, Milwaukee, WI (US)

(72) Inventors: Luke Skinner, West Bend, WI (US); Timothy Ryan Obermann, Waukesha, WI (US); Benjamin Oliver Ryan Cabot, Milwaukee, WI (US); Thomas Cunningham Hanks, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 16 days.

(21) Appl. No.: 16/683,313

(22) Filed: Nov. 14, 2019

(65) Prior Publication Data

US 2020/0078974 A1 Mar. 12, 2020

Related U.S. Application Data

(63) Continuation of application No. 15/455,594, filed on Mar. 10, 2017, now Pat. No. 10,507,590.
(Continued)

(51) Int. Cl.
*G05B 19/18* (2006.01)
*B26D 5/00* (2006.01)
*B26D 5/08* (2006.01)

(52) U.S. Cl.
CPC ............ *B26D 5/005* (2013.01); *B26D 5/086* (2013.01); *G05B 19/182* (2013.01); *G05B 2219/37087* (2013.01)

(58) Field of Classification Search
CPC ...... B26D 5/005; B26D 5/086; G05B 19/182; G05B 2019/37087
See application file for complete search history.

(56) References Cited

U.S. PATENT DOCUMENTS 4,339,942 A 7/1982 Svensson
4,463,496 A 8/1984 Reich et al.
(Continued)

FOREIGN PATENT DOCUMENTS

CA 2774505 A1 10/2013
EP 2332682 B1 6/2011
(Continued)

OTHER PUBLICATIONS

PICOUP-EXP-240-I, Application Information Sheet, dated Oct. 15, 2012, Revised Sep. 6, 2007.
(Continued)

*Primary Examiner* — Evan H MacFarlane
*Assistant Examiner* — Liang Dong
(74) *Attorney, Agent, or Firm* — Quarles & Brady LLP

(57) ABSTRACT

An example system includes a cutting tool and a device configured to remotely control the cutting tool. The device is configured to establish a wireless communication with the cutting tool, and the cutting tool is configured to send a first signal to the device indicating that the cutting tool is enabled to be operated remotely responsive to the cutting tool receiving information indicating that a trigger is locked in an "on" state and a remote switch is in a first position. The device is configured to send a second signal to the cutting tool indicating a request to cause the cutting tool to perform a cutting operation responsive to receiving information indicative of actuation of at least one button of a user interface of the device.

16 Claims, 19 Drawing Sheets

Related U.S. Application Data

(60) Provisional application No. 62/307,776, filed on Mar. 14, 2016.

(56) References Cited

U.S. PATENT DOCUMENTS

| | | |
|---|---|---|
| 4,604,890 A | 8/1986 | Martin |
| 5,113,679 A | 5/1992 | Ferraro et al. |
| 5,152,196 A | 10/1992 | Garrett |
| 5,195,042 A | 3/1993 | Ferraro et al. |
| D356,478 S | 3/1995 | Heskey et al. |
| 5,553,478 A | 9/1996 | Di Troia |
| D383,046 S | 9/1997 | Moffatt et al. |
| D387,961 S | 12/1997 | Yasui et al. |
| 5,727,417 A | 3/1998 | Moffatt et al. |
| D404,627 S | 1/1999 | Hirabayashi |
| 5,867,909 A | 2/1999 | Jeltsch |
| D408,242 S | 4/1999 | Yamamoto |
| 5,979,215 A | 11/1999 | Lefavour et al. |
| 6,230,542 B1 | 5/2001 | Frenken |
| 6,276,186 B1 | 8/2001 | Frenken |
| 6,401,515 B2 | 6/2002 | Frenken |
| 6,446,482 B1 | 9/2002 | Heskey et al. |
| 6,532,790 B2 | 3/2003 | Frenken |
| 6,564,610 B2 | 5/2003 | Lefavour et al. |
| 6,666,064 B2 | 12/2003 | LeFavour et al. |
| 6,668,613 B2 | 12/2003 | Lefavour et al. |
| 6,792,789 B1 | 9/2004 | Faucher |
| 6,986,274 B2 | 1/2006 | Lefavour et al. |
| 7,066,003 B2 | 6/2006 | Lefavour et al. |
| 7,124,619 B1 | 10/2006 | Lefavour et al. |
| 7,240,490 B2 | 7/2007 | Baumuller et al. |
| 7,254,982 B2 | 8/2007 | Frenken |
| 7,412,868 B2 | 8/2008 | Frenken |
| 7,421,877 B2 | 9/2008 | Frenken |
| 7,464,578 B2 | 12/2008 | Ayer et al. |
| D591,128 S | 4/2009 | Chuan |
| 7,533,556 B2 | 5/2009 | Lefavour et al. |
| 7,614,139 B1 | 11/2009 | Itrich |
| 7,640,780 B2 | 1/2010 | Ruland |
| 7,762,117 B2 | 7/2010 | Faucher et al. |
| 7,788,962 B2 | 9/2010 | Chiasson et al. |
| 7,841,223 B2 | 11/2010 | Rollins et al. |
| 7,926,321 B2 | 4/2011 | Rollins et al. |
| D676,298 S | 2/2013 | Tully et al. |
| 8,678,304 B2 | 3/2014 | Gmelin |
| D709,748 S | 7/2014 | Frenken |
| D710,173 S | 8/2014 | Frenken |
| 9,016,317 B2 | 4/2015 | Myrhum, Jr. |
| D730,140 S | 5/2015 | Barezzani et al. |
| 10,051,672 B2 * | 8/2018 | Nakayama ............ H04W 84/20 |
| 10,471,618 B2 | 11/2019 | Skinner |
| 10,792,832 B2 | 10/2020 | Skinner |
| 2005/0132771 A1 | 6/2005 | Lefavour et al. |
| 2005/0150343 A1 | 7/2005 | Deimel et al. |
| 2006/0272381 A1 | 12/2006 | Ayer et al. |
| 2008/0282507 A1 | 11/2008 | Chiasson et al. |
| 2008/0282763 A1 | 11/2008 | Chiasson et al. |
| 2012/0029775 A1 * | 2/2012 | Peters .................. F15B 11/162 |
| | | 700/282 |
| 2012/0279615 A1 | 11/2012 | Terrell |
| 2013/0193891 A1 * | 8/2013 | Wood ...................... H02P 6/08 |
| | | 318/434 |
| 2013/0225127 A1 * | 8/2013 | Cavacuiti ............... H04W 4/20 |
| | | 455/411 |
| 2014/0110021 A1 | 4/2014 | Devine |
| 2014/0157522 A1 | 6/2014 | Lorini |
| 2014/0165410 A1 | 6/2014 | Johnson |
| 2014/0187163 A1 * | 7/2014 | Fujita ................... H04W 36/36 |
| | | 455/41.2 |
| 2014/0333525 A1 * | 11/2014 | Gromes, Sr. ........ G06F 3/04886 |
| | | 345/156 |
| 2015/0049206 A1 * | 2/2015 | Eshita ................ H04N 5/23209 |
| | | 348/207.11 |
| 2015/0290954 A1 * | 10/2015 | Koyauchi .............. B26D 1/045 |
| | | 83/522.12 |
| 2016/0351039 A1 | 12/2016 | Nishikawa |
| 2016/0363510 A1 | 12/2016 | Kanack |
| 2017/0252911 A1 * | 9/2017 | Barezzani ............... F04B 23/02 |
| 2017/0259446 A1 | 9/2017 | Skinner |

FOREIGN PATENT DOCUMENTS

| | | |
|---|---|---|
| FR | 2778032 B1 | 10/1999 |
| FR | 2863536 B1 | 6/2005 |
| WO | 2005060638 A2 | 7/2005 |

OTHER PUBLICATIONS

ECC100VAT: Safety Device Cable Cutting Head, Application Information Sheet, dated Mar. 1, 2009.

HYDROPIC-INT Tool for CAT. EHV Mains, Application Information Sheet, dated Mar. 1, 2009.

PICOUP-EXP-300-I, Application Information Sheet, dated Mar. 1, 2009.

PICOUP-EXP-350I, Dual Stage Tool for CAT, dated Oct. 1, 2009.

PICOUP2: Single State Tool for CAT(*) L.V. and M.V. Mains, Application Information Sheet, dated Apr. 18, 2001, Revised Sep. 12, 2011.

* cited by examiner

902

| Tool Beacon | Tool Side | Remote Side | Remote Beacon LEDS |
|---|---|---|---|
| ☆ | | Power Off | ○ ○ ○ |
| ⇩ | Signal Level (Remote Switch ON) | | ⇩ |
| ☆ | BEACON #1 | Power On | |
| | | LED P#1 | ☆ ○ ○ |
| | Connection Established | | ⇩ |
| | | LED P#2 | ○ ○ ○ |
| ⇩ | Lock Trigger | | ⇩ |
| ☆ | BEACON #2 | | |
| | User Leaves Cut Area | | ⇩ |
| | | Tool ARM Command: PRESS/HOLD FOR 5 Seconds | ○ ☆ ○ |
| ⇩ | | LED P#3 | |
| | | Tool ARM Completed | |
| | | LED P#4 | ○ ○ ☆ |
| ☆ | BEACON #3 | | |
| | | Cut Command | |
| | | LED P#5 | ○ ○ ☆ |
| ⇩ | | | |
| | Tool Performs Cut | | |
| | Cut Complete | | Function LEDS / RESULTS LEDS |
| ☆ | BEACON OFF | LED P#1 | ○ ○ ○ / ☆ |
| | Cut Error | | |
| ☆ | BEACON #3 | LED P#1 | ○ ○ ○ / ☆ |

FIG. 9A

| TOOLED PATTERNS | |
|---|---|
| Beacon #1 | RED LED 1/Sec |
| Beacon #2 | RED LED 2/Sec |
| Beacon #3 | RED LED 5/Sec |

| REMOTED LED PATTERNS | |
|---|---|
| Function LEDs | |
| LED P#1 | GREEN LED 1/SEC |
| LED P#2 | SOLO GREEN LED |
| LED P#3 | SOLO GREEN LED, YELLOW LED 1/SEC. |
| LED P#4 | SOLID GREEN LED, SOLID YELLOW LED, RED LED 2/SEC. |
| LED P#5 | SOLID GREEN LED, SOLID YELLOW LED, RED LED 5/SEC. |

| Test Result LED | |
|---|---|
| Complete | GREEN LED 2/SEC. Lasts 20 Seconds |
| Error | RED LED 2/SEC. Lasts 20 Seconds |

FIG. 9B

CONTROL OF A CUTTING TOOL

CROSS REFERENCE TO RELATED APPLICATIONS

The present application is a Continuation of U.S. patent application Ser. No. 15/455,594 filed on Mar. 10, 2017, which claims the benefit of U.S. Provisional Patent Application No. 62/307,776 filed Mar. 14, 2016. The entire disclosure contents of these applications are herewith incorporated by reference into the present application.

FIELD

The present disclosure relates generally to control of a cutting tool.

BACKGROUND

A cutting tool may include one or more movable blades that are actuatable by a hydraulic or electromechanical actuation system. By providing power to the actuation system, the blades move relative to each other to perform operations such as cutting, crimping, separation, blanking, etc.

SUMMARY

The present disclosure describes embodiments that relate to apparatuses and methods associated with control of a cutting tool. In a first example implementation, the present disclosure describes a cutting tool. The cutting tool includes a body; two blades coupled to the body; an actuator coupled to the body and configured to cause the two blades to move relative to each other; and a controller coupled to the body. The controller is in wireless communication with a remote device, and the controller is configured to perform operations. The operations include: (i) receiving a first signal from the remote device indicating a request to operate the cutting tool remotely; (ii) receiving information indicating that a trigger coupled to the body has been locked in an "on" state; (iii) sending a second signal to the remote device indicating that the trigger has been locked in the "on" state; and (iv) in response to receiving a third signal from the remote device, causing the actuator to move the two blades relative to each other to cut a cable placed therebetween.

In a second example implementation, the present disclosure describes a device configured to remotely control a cutting tool. The device includes a user interface comprising a plurality of user interface items; at least one processor; and date storage comprising instructions that, when executed by the at least one processor, cause the device to perform operations. The operations include: (i) receiving information indicative of actuation of a first user interface item of the plurality of interface items; (ii) responsively, sending a first signal to the cutting tool so as to request enabling the cutting tool to be operated remotely; (iii) receiving a second signal from the cutting tool indicating that the cutting tool is ready to perform a cutting operation; (iv) receiving information indicative of actuation of a second user interface item of the plurality of interface items; and (v) responsively, sending a third signal to the cutting tool so as to cause the cutting tool to perform the cutting operation.

In a third example implementation, the present disclosure describes a system. The system includes a cutting tool that includes a body, two blades coupled to the body, and an actuator coupled to the body and configured to cause the two blades to move relative to each other. The system also includes a device configured to remotely control the cutting tool. The device includes a user interface comprising a plurality of user interface items. In response to receiving information indicative of actuation of a first user interface item of the plurality of interface items, the device sends a first signal to the cutting tool so as to request enabling the cutting tool to be operated remotely. Also, in response to (i) receiving the first signal, and (ii) actuation of a trigger coupled to the cutting tool, the cutting tool sends a second signal to the device indicating that remote operation of the cutting tool has been enabled. Further, the cutting tool receives information indicating that the trigger has been locked in an "on" state, and responsively sends a third signal to the device indicating that the cutting tool is ready to perform a cutting operation. The device then receives information indicative of actuation of a second user interface item of the plurality of interface items, and responsively, sends a fourth signal to the cutting tool so as to cause the cutting tool to perform the cutting operation.

In a fourth example implementation, the present disclosure describes performing the following operations: (i) enabling a cutting tool to be operated remotely in response to receiving a first signal from a remote device, where the cutting tool includes a body, two blades coupled to the body, and an actuator coupled to the body and configured to cause the two blades to move relative to each other, and where the cutting tool is in wireless communication with the remote device; (ii) receiving information indicating that a trigger coupled to the body of the cutting tool has been locked in an "on" state; (iii) sending a second signal to the remote device indicating that the trigger has been locked in the "on" state; and (iv) in response to receiving a third signal from the remote device, causing the actuator to move the two blades relative to each other to cut a cable placed therebetween.

In a fifth example implementation, the present disclosure describes performing the following operations: (i) receiving information indicative of actuation of a first user interface item of a plurality of interface items of a device configured to remotely control a cutting tool; (ii) responsively, sending a first signal to the cutting tool so as to request enabling the cutting tool to be operated remotely; (iii) receiving a second signal from the cutting tool indicating that remote operation of the cutting tool has been enabled; (iv) receiving a third signal from the cutting tool indicating that the cutting tool is ready to perform a cutting operation; (v) receiving information indicative of actuation of a second user interface item of the plurality of interface items; and (vi) responsively, sending a fourth signal to the cutting tool so as to cause the cutting tool to perform the cutting operation.

In a sixth example implementation, the present disclosure describes a cutting tool. The cutting tool includes a body, a remote switch, a trigger coupled to the body, a trigger lock switch, two blades coupled to the body, an actuator, and a controller. The remote switch is coupled to the body and configured to be toggled between at least a first position and a second position. The trigger lock switch is coupled to the body and configured to lock the trigger in an "on" state. The actuator is coupled to the body and configured to cause the two blades to move relative to each other. The controller is coupled to the body and configured to wirelessly communicate with a remote device. Further, the controller is configured to perform operations including: (i) establishing wireless connection with the remote device; (ii) receiving information indicating that the trigger is locked in the "on" state and the remote switch is in the first position; (iii) responsive to receiving the information indicating that the trigger is locked in the "on" state and the remote switch is in the first position, sending a first signal to the remote device indicating that the cutting tool is enabled to be operated remotely; and (iv) responsive to receiving a second signal from the remote device, causing the actuator to move the two blades relative to each other to cut a cable placed therebetween.

In a seventh example implementation, the present disclosure describes a device configured to remotely control a cutting tool. The device includes a user interface, at least one processor, and data storage. The user interface includes a first button and a second button. The data storage includes instructions, that when executed by the at least one processor, cause the device to perform operations including: (i) establishing a wireless connection with the cutting tool; (ii) receiving a first signal from the cutting tool indicating that the cutting tool is enabled to be operated remotely; (iii) receiving information indicative of actuation of the first button; (iv) responsive to receiving the information indicative of the actuation of the first button, sending a second signal to the cutting tool indicating a request to arm the cutting tool; (v) receiving information indicative of actuation of the second button; and (vi) responsive to receiving the information indicative of the actuation of the second button, sending a third signal to the cutting tool indicating a request to cause the cutting tool to perform a cutting operation.

In an eighth example implementation, the present disclosure describes a system including a cutting tool and a device configured to remotely control the cutting tool. The cutting tool includes a body, a remote switch, a trigger coupled to the body, a trigger lock switch, two blades coupled to the body, and an actuator. The remote switch is coupled to the body and configured to be toggled between at least a first position and a second position. The trigger lock switch is coupled to the body and configured to lock the trigger in an "on" state. The actuator is coupled to the body and configured to cause the two blades to move relate to each other. The device includes a user interface including at least one button. The device is configured to establish a wireless connection with the cutting tool. The cutting tool is configured to send a first signal to the device indicating that the cutting tool is enabled to be operated remotely responsive to the cutting tool receiving information indicating that the trigger is locked in the "on" state and the remote switch is in the first position. The device is configured to send a second signal to the cutting tool indicating a request to cause the cutting tool to perform a cutting operation responsive to receiving information indicative of actuation of the at least one button.

In a ninth example implementation, the present disclosure describes performing the following operations: (i) establishing, by a cutting tool, a wireless connection with a remote device; (ii) receiving, by the cutting tool, information indicating that a trigger of the cutting tool is locked in an "on" state and a remote switch of the cutting tool is in a first position; (iii) responsive to receiving the information indicating that the trigger is locked in the "on" state and the remote switch is in the first position, sending, by the cutting tool, a first signal to the remote device indicating that the cutting tool is enabled to be operated remotely; (iv) receiving, by the cutting tool, a second signal from the remote device indicating a request to perform a cutting operation, and (v) responsive to receiving the second signal from the remote device, causing the cutting tool to perform the cutting operation.

In a tenth example implementation, the present disclosure describes performing the following operations: (i) establishing, by a device, a wireless connection with a cutting tool; (ii) receiving, by the device, a first signal from the cutting tool indicating that the cutting tool is enabled to be operated remotely; (iii) receiving, by the device, information indicative of actuation of a first button of a user interface of the device; (iv) responsive to receiving the information indicative of the actuation of the first button, sending, by the device, a second signal to the cutting tool indicating a request to arm the cutting tool; (v) receiving information indicative of actuation of a second button of the user interface; and (vi) responsive to receiving the information indicative of the actuation of the second button, sending, by the device, a third signal to the cutting tool indicating a request to cause the cutting tool to perform a cutting operation.

In an eleventh example implementation, the present disclosure describes a non-transitory computer readable medium having stored therein instructions that, when executed by a computing device, cause the computing device to perform operations in accordance with the fourth example implementation. In a twelfth example implementation, the present disclosure describes a non-transitory computer readable medium having stored therein instructions that, when executed by a computing device, cause the computing device to perform operations in accordance with the fifth example implementation. In a thirteenth example implementation, the present disclosure describes a non-transitory computer readable medium having stored therein instructions, that when executed by a computing device, cause the computing device to perform operations in accordance with the ninth example implementation. In a fourteenth example implementation, the present disclosure describes a non-transitory computer readable medium having stored therein instructions, that when executed by a computing device, cause the computing device to perform operations in accordance with the tenth example implementation. Further additional example implementations are described as well that include any combination of the implementations.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 9A and 9B illustrate example indications that may be provided by a cutting tool and a device, in accordance with an example implementation.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

In examples, electrical equipment may be maintained while operating at high voltages. An example maintenance operation may involve cutting a live line. In this example, it is desirable to perform a cable cutting operation by way of a remotely controlled cutting tool so as to insulate workers from any electrical hazards.

In other examples, the line might not be easily reachable. For instance, the cable may be in an underwater environment, and may thus be cut via remote control of the cutting tool. Disclosed herein are systems, devices, and methods for remote control of a cutting tool to insulate workers from hazardous environments.

II. EXAMPLE SYSTEMS

Figure 1:
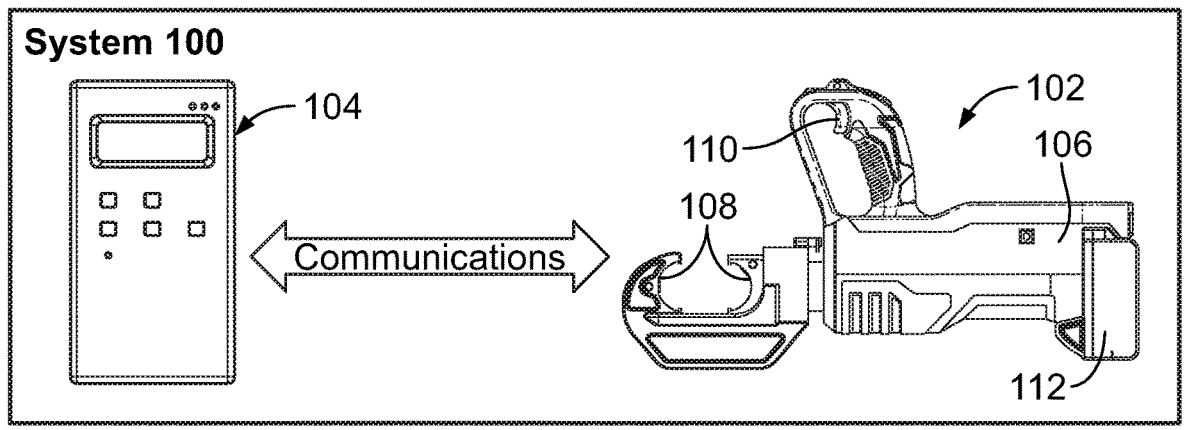
FIG. 1 illustrates a system, in accordance with an example implementation.

FIG. 1 illustrates a system 100, in accordance with an example implementation. The system 100 includes a cutting tool 102, and a device 104 configured to remotely control the cutting tool 102. The cutting tool 102 includes a body 106 and one or more blades 108. The cutting tool 102 may also include a trigger 110.

In examples, the cutting tool may be electromechanically actuated. For instance, the cutting tool 102 may include an electric motor configured to cause a spindle to rotate, thus causing an actuator coupled to the spindle to move linearly. The actuator may be coupled to at least one of the blades 108, and may cause the blades 108 to move relative to each other to cut a cable disposed therebetween. The motor, spindle, and actuator may be coupled to the body 106.

In another example, the cutting tool may be hydraulically actuated. For instance, a motor may be configured to drive a hydraulic pump, which pressurizes hydraulic fluid and provides the pressurized fluid to an actuator (e.g., a linear hydraulic cylinder). A piston of the actuator may be coupled to at least one of the blades 108 such that motion of the piston may cause the blades 108 to move relative to each other. Other actuation mechanisms are possible.

Also, in examples, the cutting tool 102 may be powered by a battery 112. However, the cutting tool 102 may be coupled to an electric line that provides power to the cutting tool 102.

In examples, the cutting tool 102 may include two blades 108. In an example, motion of the actuator may cause both blades 108 to move relative to each other. In another example, the actuator may cause one blade to move, while the other blade remains stationary. In still another example, the cutting tool 102 may include only one blade 108 movable by the actuator.

Further, the cutting tool 102 may include a controller coupled to or embedded within the body 106. The controller may be configured to operate the cutting tool 102. For example, the controller may be in communication with sensors coupled to the cutting tool 102. The controller may also be in communication with the trigger 110 and components of the actuation mechanism of the cutting tool 102. For instance, if the trigger 110 is pulled, the controller may, in response cause power from the battery 112 to be provided to the actuation mechanism. The controller may further operate the actuation mechanism based on sensor inputs. Example sensor inputs include position sensor information indicating position of an actuator, pressure sensor information indicating hydraulic pressure in chambers of a hydraulic actuator, etc.

Additionally, the cutting tool 102 may include one or more antennae that facilitate sending and receiving messages to and from other devices, such as the device 104.

The device 104 can be, for example, a mobile phone, personal digital assistant (PDA), laptop, notebook, or netbook computer, tablet computing device, etc. The device 104 may have a user interface to interact with operators/users.

Figure 2:
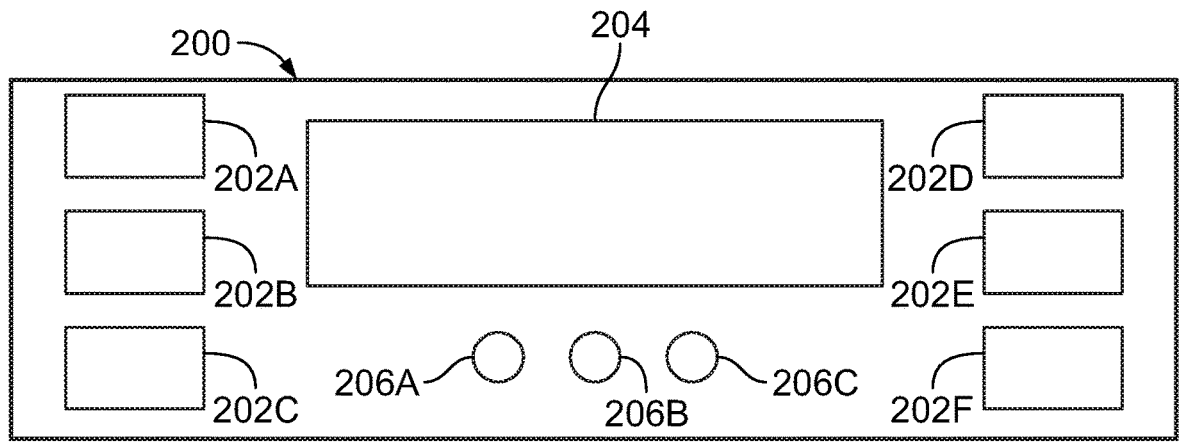
FIG. 2 illustrates a user interface of a device, in accordance with an example implementation.

FIG. 2 illustrates a user interface 200 of the device 104, in accordance with an example implementation. The user interface 200 may include a plurality of user interface items. For instance, the user interface 200 may include userselectable buttons 202A, 202B, 202C, 202D, 202E, and 202F. These buttons may be mechanically actuatable, or may be on-screen touch buttons. The user interface 200 may also include a display 204 configured to display messages and accept inputs from a user. The user interface 200 may also include indicators 206A, 206B, and 206C. Each of these indicators may, for example, emit light of a particular color to indicate a particular status of the cutting tool 102 or the device 104. These user interface items are examples for illustration only, and other user interface items and configurations are possible.

Figure 3:
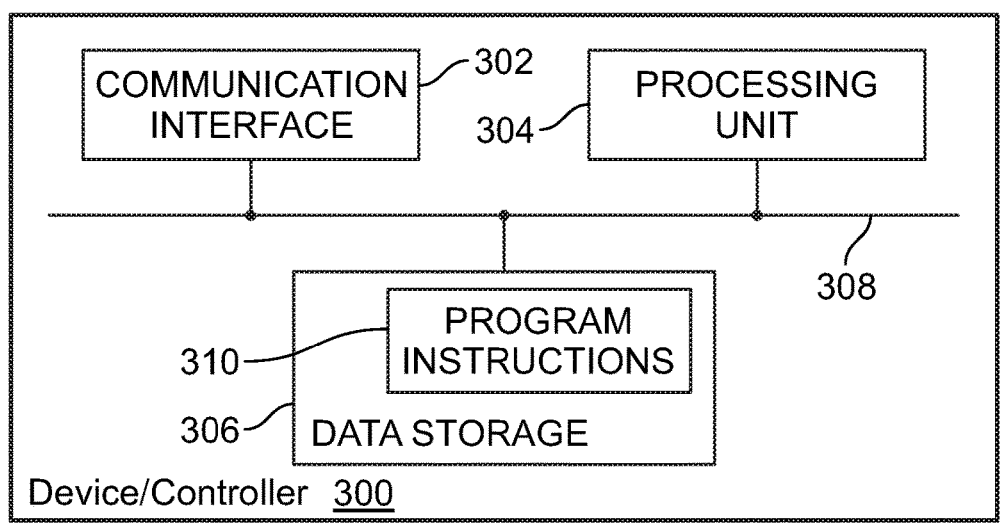
FIG. 3 illustrates a simplified block diagram of a controller or a device, in accordance with an example implementation.

FIG. 3 is a simplified block diagram of a controller or a device, in accordance with an example implementation. FIG. 3 shows some of the components that may be included in the device 104 or the controller of the cutting tool 102 to facilitate carrying out operations described herein.

As shown in FIG. 3, the device includes a communication interface 302, a processing unit 304, and non-transitory data storage 306, all of which may be communicatively linked together by a system bus, network, or other connection mechanism 308. Further, although these components are shown as discrete blocks in the figure, the components could be integrated together in various ways and/or distributed, replicated, or arranged in some other manner.

The communication interface 302 may operate to facilitate communication with various other entities. For instance, if the device 300 represents the device 104, then the communication interface 302 facilitates transmitting signals/ messages from the device 104 to the cutting tool 102 and receiving signals/messages from the cutting tool 102. Similarly, if the device 300 represents the controller of the cutting tool 102, then the communication interface 302 facilitates transmitting signals/messages from the controller to the device 104 and receiving signals/messages from the device 104.

As such, the communication interface 302 may include one or more network communication interface modules, such as Ethernet network communication interface modules for instance, or may take any of a variety of other forms, supporting wireless and/or wired communication according to any of a variety of network communication protocols such as Bluetooth, Near Field Communication (NFC), etc. Further, the device 300 may include one or more antennae to facilitate communication with other devices.

Processing unit 304 may include one or more general purpose processors (such as microprocessors) and/or one or more special purpose processors (e.g., application specific integrated circuits). The data storage 306 may comprise one or more volatile and/or non-volatile storage components, such as optical, magnetic, or flash storage. As shown, the data storage 306 may hold program instructions 310 that are executable by processing unit 304 to carry out various operations described herein.

The cutting tool 102 may be configured to operate in at least two operating modes: a normal mode and a remote-cut mode. In the normal mode, an operator may place a cable between the blades 108 and pull the trigger 110 causing the actuator to move the blades 108 relative to each other and cut the cable. As long as the operator is pulling the trigger 110, the actuation mechanism is powered, e.g., power is provided to the motor that controls motion of the actuator. But, as the operator releases the trigger 110, power is disconnected from the actuation mechanism. Thus, this normal mode of operation may be safe if the cable is not energized as the operator stays close to the cutting tool 102, possibly holding the cutting tool 102, while the cutting operation is being performed.

In the remote-cut mode, however, the cutting tool 102 may be remotely controlled via the device 104. The cutting tool 102 may be in wireless communication with the device 104. Thus, the cutting tool 102 and the device the device 104 may exchanges signals and messages associated with performance of a cutting operation. Particularly, the device 104 may be used to remotely control the cutting tool 102 to perform a cutting operation while an operator is away from the cutting tool 102.

Figure 4A:
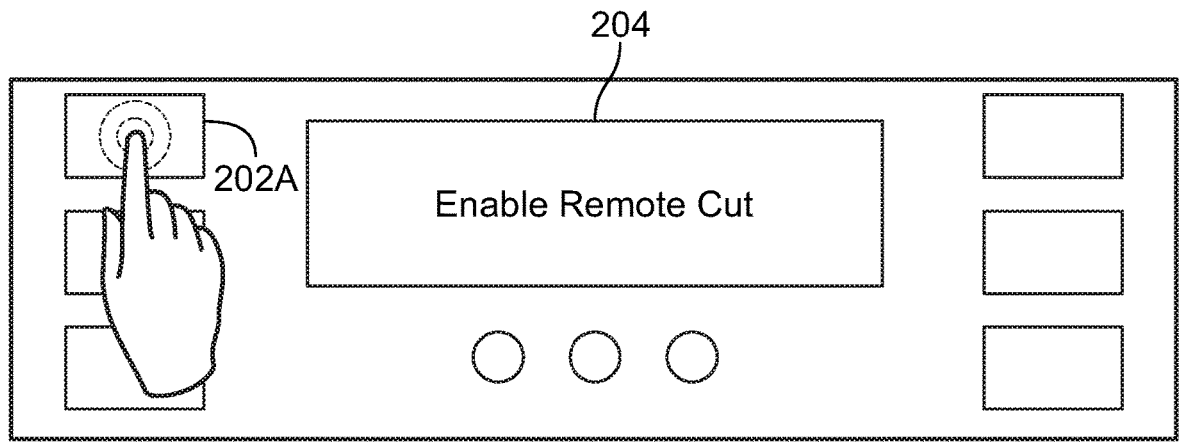
FIGS. 4A, 4B, 4C, 4D, 4E, 4F, 4Q and 4H illustrate procedure for enabling remote-cut mode, in accordance with an example implementation.

A first step associated with the remote-cut mode may involve verifying that a user or operator wants to start a remote-cut operation. FIGS. 4A-4H illustrate procedure for enabling remote-cut mode, in accordance with an example implementation. As shown in FIG. 4A, an operator may press the button 202A of the device 104 to initiate enabling the remote-cut mode. In response, a processor of the device 104 may generate a display of a message, e.g., "Enable Remote Cut," on the display 204 to alert the operator that the 202A button has been pressed or selected.

Figure 4B:
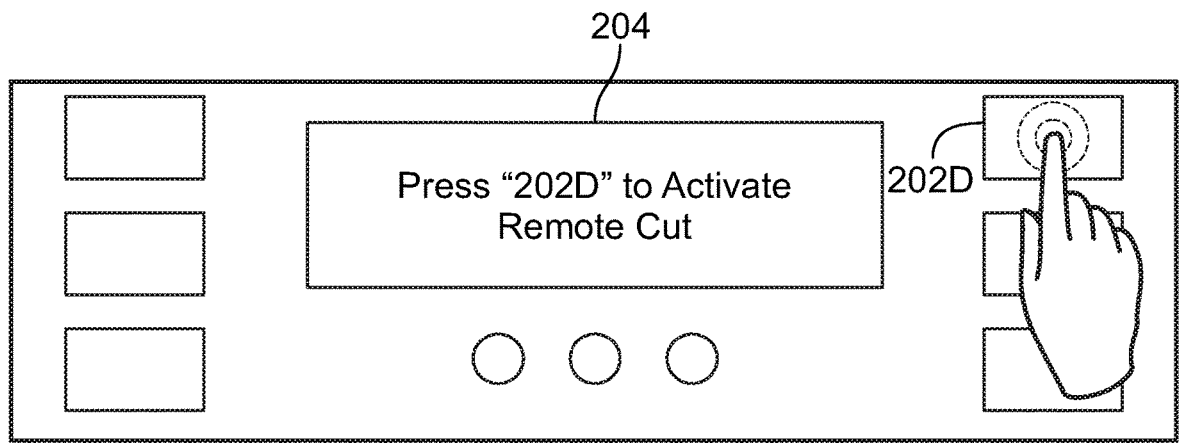

To ensure that the button 202A has been pressed intentionally, the device 104 may request a confirmation from the operator. As such, the device 104 may prompt the operator for a second enable criterion in addition to pressing the button 202A. For instance, assuming that the button 202D is blue, a display of a message, e.g., "Press 'Blue' to Activate Remote Cut," may be generated on the display 204 as shown in FIG. 4B. The operator may then press the button 202D to confirm that the operate intended to enable the remote-cut mode. Additionally, the device 104 may also determine an amount of time that elapsed between pressing the button 202A and pressing the button 202D. If the amount of time is less than a threshold period of time, e.g., 10 seconds, then the device 104 determines that the operator intends to initiate the remote-cut mode. If the period of time exceeds the threshold period of time, then the device 104 discards the previous pressing or selection of the button 202A, and does not initiate enabling the remote-cut mode.

Figure 4C:
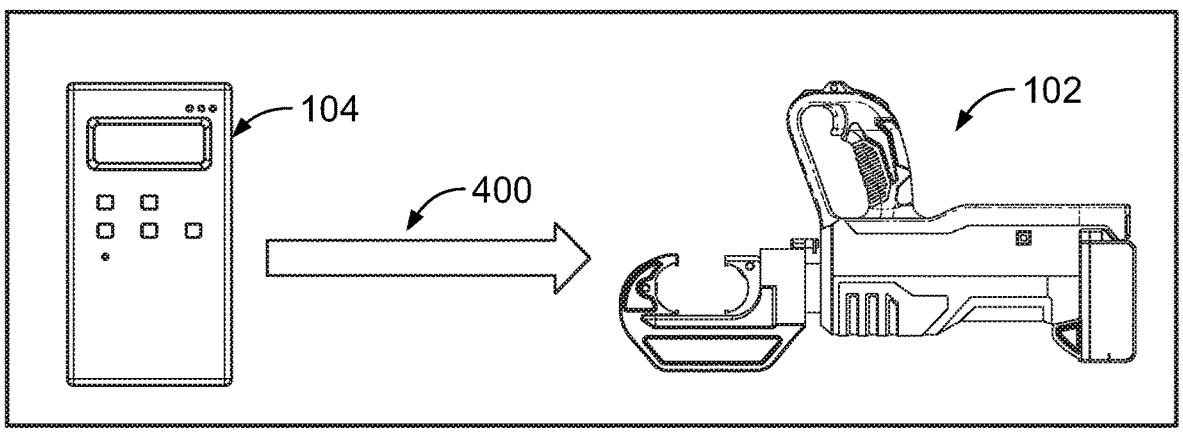

Assuming that the button 202D was pressed within the threshold amount of time, the device 104 verifies the operator's intention to initiate the remote-cut mode. In response, the device 104 may then transmit or send a signal 400 to the cutting tool 102, as shown in FIG. 4C, to command the controller of the cutting tool 102 to prepare for a remote-cut operation.

Figure 4D:
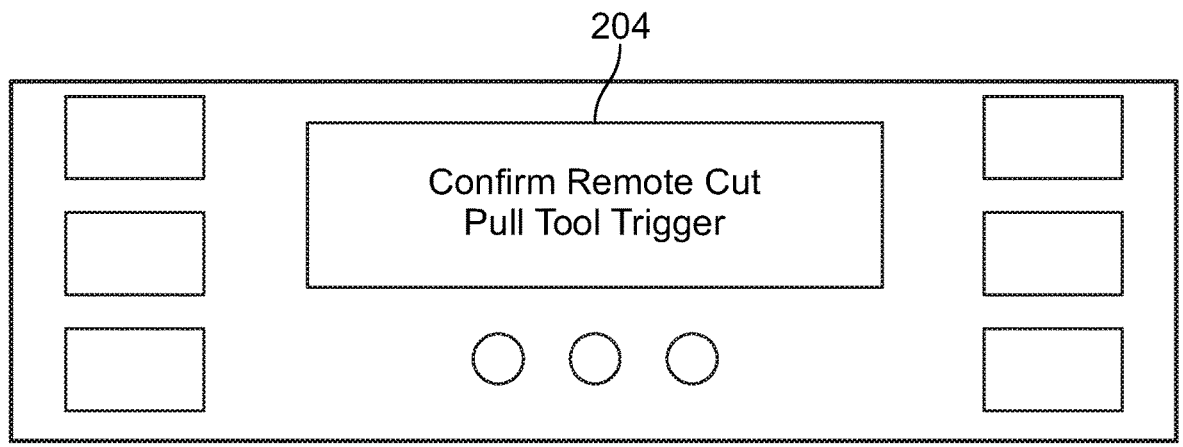
Figure 4E:
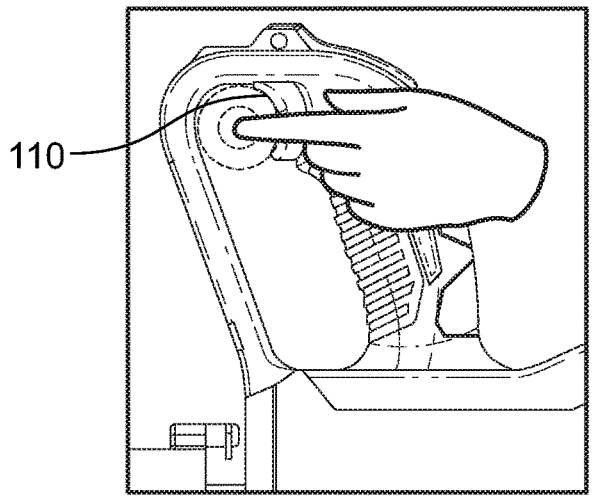
Figure 4F:
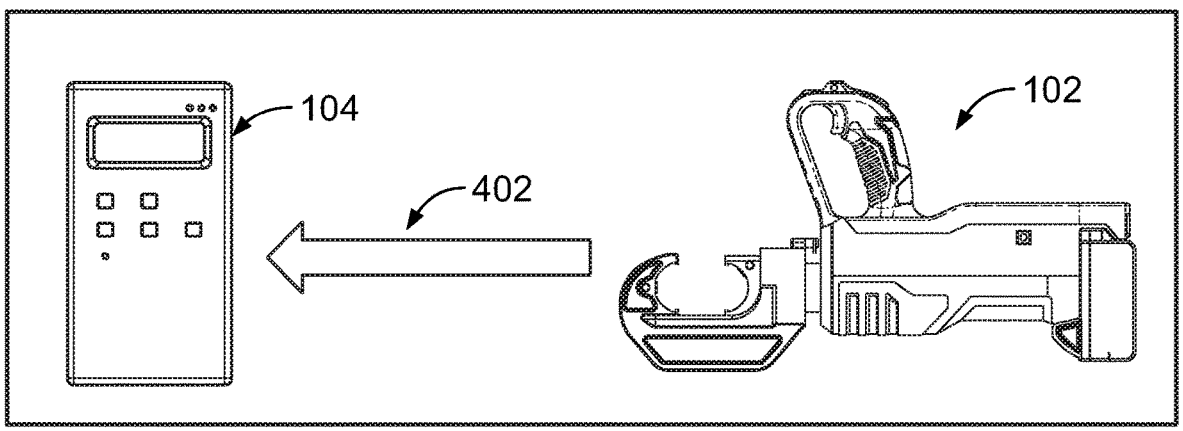
Figure 4G:
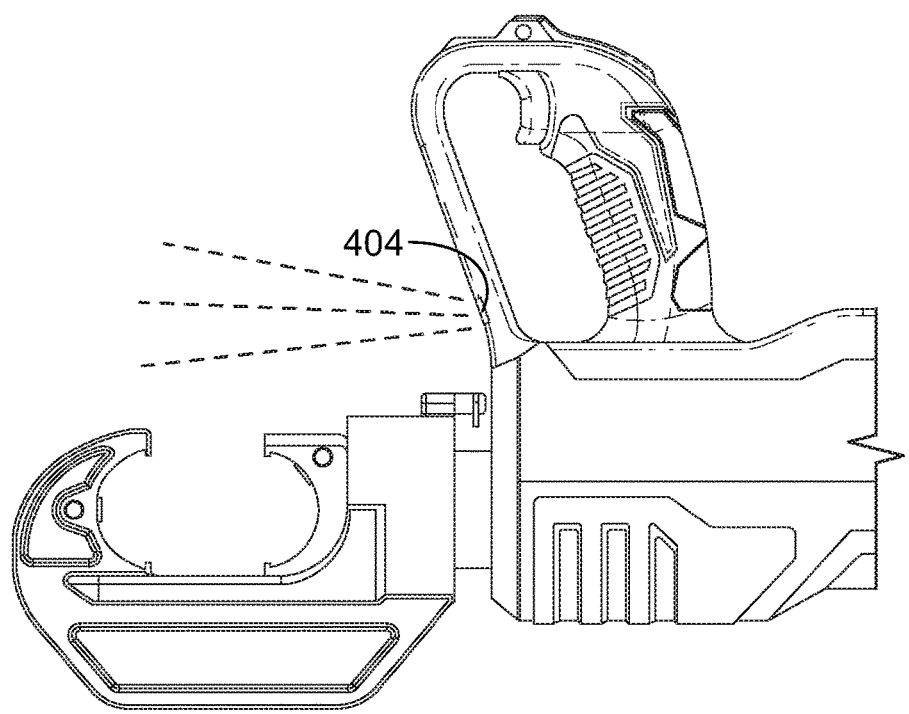

Further, as shown in FIG. 4D, the device 104 may request a third enable criterion from the operator. Particularly, a display of a message, e.g., "Confirm Remote Cut Pull Tool Trigger," may be generated on the display 204 to prompt the operator to actuate or pull the trigger 110 as shown in FIG. 4E. If the operator pulls the trigger 110, the controller of the cutting tool 102 may send a signal/message 402 to the device 104 to confirm that the trigger 110 has been pulled and that the cutting tool 102 is in the remote-cut mode, as shown in FIG. 4F. The exchange of signals between the cutting tool 102 and the device 104 further serves to verify that communication therebetween is established.

It should be noted that if the cutting tool 102 is in the normal mode of operation, pulling the trigger 110 may cause the actuator of the cutting tool 102 to be powered and the blades 108 to move relative to each other. However, because the cutting tool 102 had received the signal 400 from the device 104 that commands the cutting tool 102 to prepare for the remote-cut mode, pulling the trigger 110 in FIG. 4E does not cause the actuator to be powered. If the signal 400 was not received correctly at the cutting tool 102 due to, for example, communication faults, pulling the trigger 110 might cause the actuator to be powered. This indicates to the operator that communication has not been established or that the procedure for enabling the remote-cut mode might not have been followed correctly.

In addition to sending the signal 402 to the device 104, the cutting tool 102 may provide an indication to the operator that the cutting tool 102 is now in the remote-cut mode (e.g., the cutting tool 102 switched from a normal mode of operation to the remote-cut mode of operation). For instance, the cutting tool 102 may have a light emitting diode (LED) indicator 404 shown in FIG. 4G The controller of the cutting tool 102 may cause the LED indicator 404 to flash or emit light intermittently at a particular frequency (e.g., 2 flashes/second) to notify the operator that the remote-cut mode is enabled.

In an example, the controller may further start a timer upon sending the message 402 to the device 104. If a threshold period of time (e.g., 2 minutes) lapses from the start of the timer without receiving further communications from the device 104, the controller may cause the cutting tool 102 to disable or exit the remote-cut mode and switch back to the normal mode of operation.

Figure 4H:
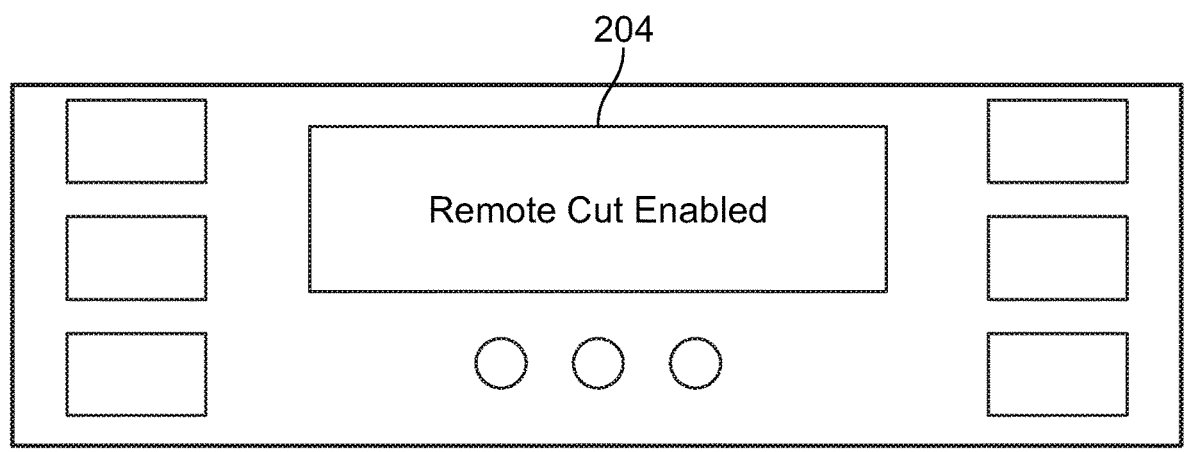

Upon receiving the signal 402 at the device 104, a display of a message, e.g., "Remote Cut Enabled" as shown in FIG. 4H, may be generated on the display 204 to further confirm to the operator that the remote-cut mode is enabled.

Now that the remote-cut mode is enabled, the operator may next prepare the cut location at the cutting tool 102. For instance, the operator may place a cable between the blades 108. Flashing of the LED indicator 404 indicates to the operator that the cutting tool 102 is still in the remote-cut model.

Figure 5A:
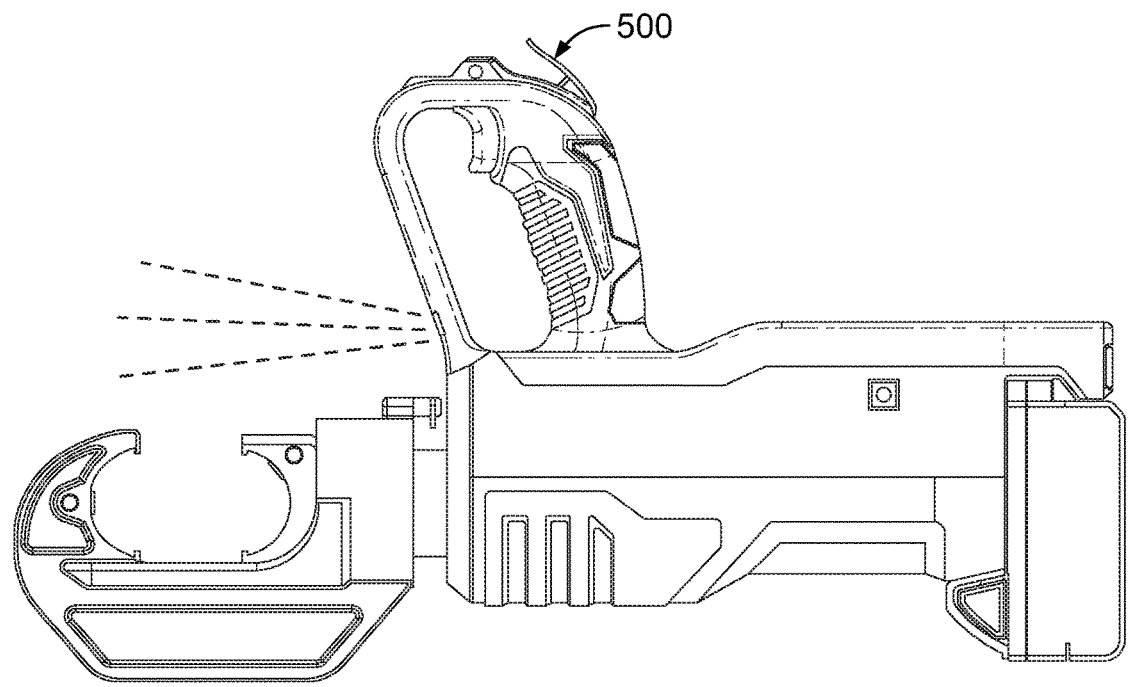
FIGS. 5A, 5B, 5C, and 5D illustrate procedure for arming a cutting tool, in accordance with an example implementation.

A second step associated with the remote-cut mode may involve arming or readying the cutting tool 102 before the operator exits the cut location to avoid any hazards. FIGS. 5A-5D illustrate procedure for arming the cutting tool 102, in accordance with an example implementation. As shown in FIG. 5A, the cutting tool 102 may further include a trigger lock 500. If the trigger 110 is pulled, and then the trigger lock 500 is actuated, e.g., pressed down, then the trigger 110 is locked in an "on" state. The "on" state of the trigger 110 could also be referred to as an "active" or "enabled" state. This process may require both hands of the operator: one hand to pull the trigger 110, and a second hand to actuate the trigger lock 500. This is a safety precaution as the operator cannot lock the trigger 110 in the "on" state accidently by one hand.

Although FIG. 5A illustrates the trigger lock 500 as being located on a handle of the cutting tool 102, in another embodiment, the trigger lock 500 may be located further away from the trigger 110. For instance, the trigger lock 500 may be located at a position 508. Other positions for the trigger lock 500 are also contemplated. Thus, the examples shown in FIG. 5A are not meant to be limiting.

In some examples, the trigger lock 500 may also serve as an immediate stop button on the cutting tool 102. For instance, an operator may quickly interrupt a remote-cut by toggling the trigger lock 500 to an "unlock" position, thereby disabling the remote-cut.

Figure 5B:
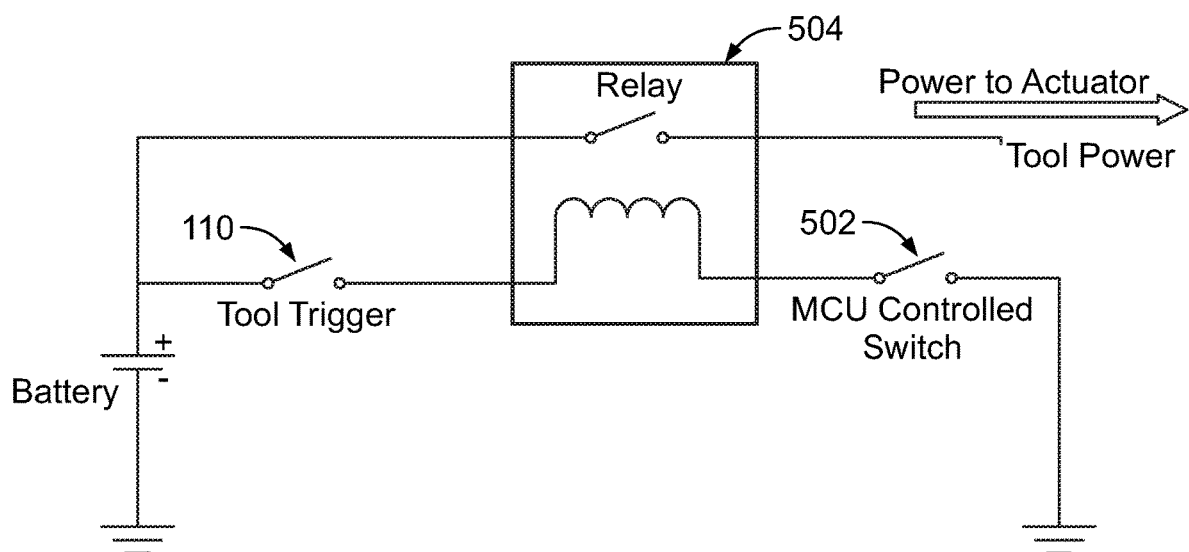

FIG. 5B illustrates a simplified electric circuit for the cutting tool 102, in accordance with an example implementation. A switch 502 is controlled by a main control unit (MCU), i.e., the controller of the cutting tool 102. As shown by the electric circuit, both the trigger 110 and the switch 502 need to be activated for a relay 504 to be energized, and thus deliver power to the actuator of the cutting tool 102.

Thus, to operate the cutting tool 102 remotely, the trigger 110 has to stay in the "on" state, i.e., stayed pulled. In this manner, when the controller activates or turns on the switch 502, power would be delivered to the actuator, thus causing the cutting tool 102 to perform a cutting operation. When the trigger lock 500 is pushed by the operator while the trigger 110 is pulled, the trigger lock 500 mechanically locks the trigger 110 in the "on" state. In this case, the cutting tool 102 is armed, such that when the controller turns on the switch 502, power is delivered to the actuator of the cutting tool 102.

In an example, the controller of the cutting tool 102 may start a timer when the trigger 110 is locked in the "on" state by the trigger lock 500. If the trigger 110 or the trigger lock 500 remains depressed for a threshold period of time (e.g., 20 seconds), the controller confirms that the operator intends to arm the cutting tool 110. The operator can disarm the cutting tool 110 with one hand by disengaging the trigger lock 500.

Figure 5C:
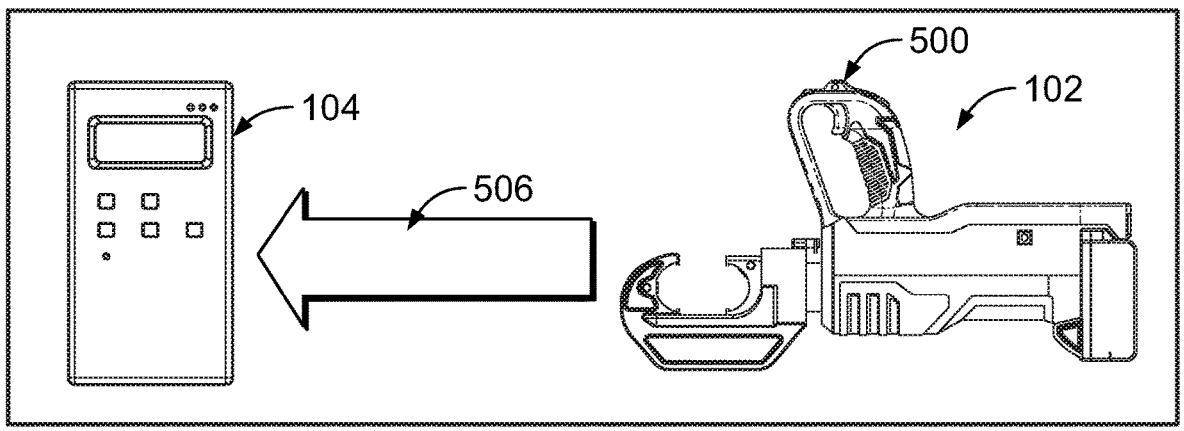
Figure 5D:
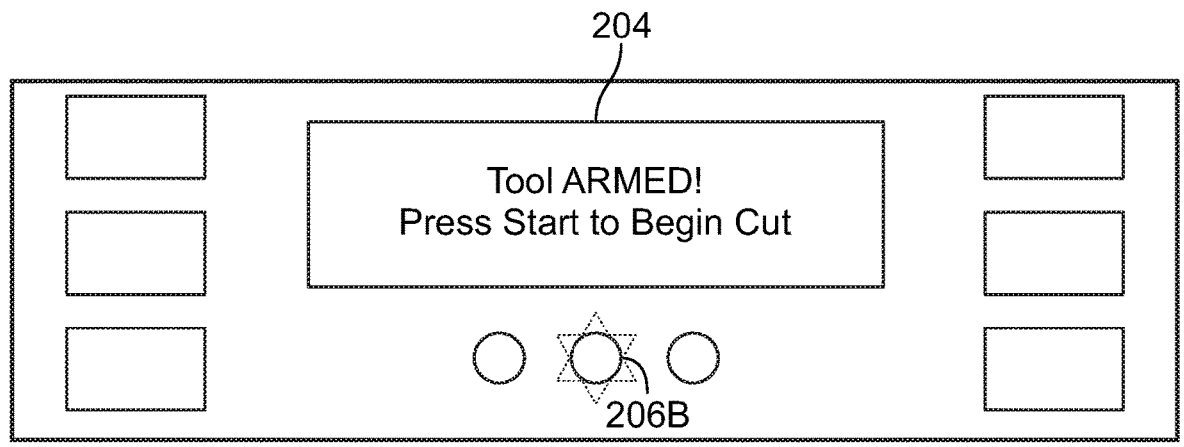

When the controller confirms that the operator intends the cutting tool 102 to be armed, the controller sends a signal 506, as shown in FIG. 5C, to the device 104 to inform the device 104 that the trigger 110 is held in the "on" state and the cutting tool 102 is armed. In response, a display of a message, e.g., "Tool Armed! Press Start to Begin Cut," may be generated on the display 204. Further, the device 104 may cause one of the indicators, such as the light indicator 206B, as shown in FIG. 5D, to flash with a particular color (e.g., red) to further indicate to the operator that the cutting tool 102 is armed and ready to perform a cutting operation.

In an example, the controller of the cutting tool 102 may start a timer when the cutting tool 102 is armed. If controller does not receive an indication from the device 104 to start a cutting operation within a threshold period of time (e.g., 20 seconds, 2 minutes, etc.), the controller may disarm the cutting tool 102. The cutting tool 102 may then stay in the remote-cut mode and wait for a re-arming procedure, or the controller may cause the cutting too to revert back to the normal operating mode.

A third step associated with the remote-cut mode may involve starting the cutting operation. Now that the cutting tool 102 is armed and ready to perform the cutting operation, the operator exits or has already exited the cutting location to avoid any hazards. The operator can control the cutting tool remotely via the device 104.

FIGS. 6A-6G illustrate procedure for performing a remote cutting operation, in accordance with an example implementation. To confirm that the operator intends to command the cutting tool 102 to cut a cable placed between the blades 108, the operator may be required to press and hold one or more buttons for a particular period of time (e.g., 3 seconds).

Figure 6A:
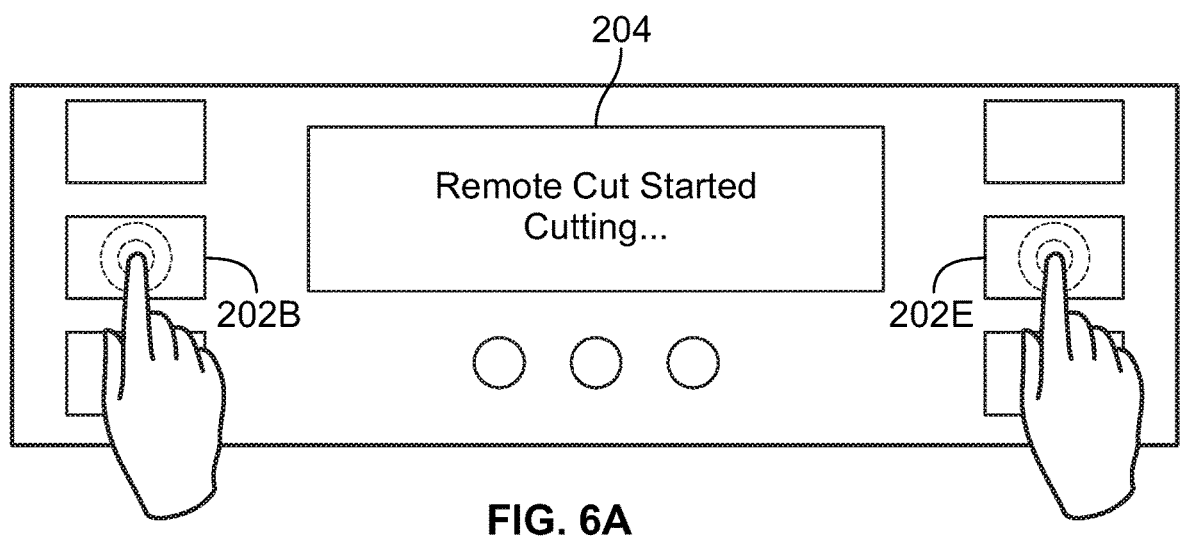
FIGS. 6A, 6B, 6C, 6D, 6E, 6F, and 6G illustrate procedure for performing a remote cutting operation, in accordance with an example implementation.

FIG. 6A illustrates an operator pressing the buttons 202B and 202E to starting the cutting operation remotely. The buttons 202B and 202E are placed on the user interface 200 of the device 104 so as to ensure that the operator uses both hands to command starting the cutting operation, which further confirms the operator's intention. The buttons 202B and 202E may be pressed at substantially the same time (e.g., the operator may begin pressing the button 202B and then within a threshold period of time, such as 100 milliseconds, begins pressing the other button 202E). Requiring the operator to use both hands to send the cutting command further ensures that the operator's hands are away from the cutting tool 102 and thus further enhances operator safety.

Figure 6B:
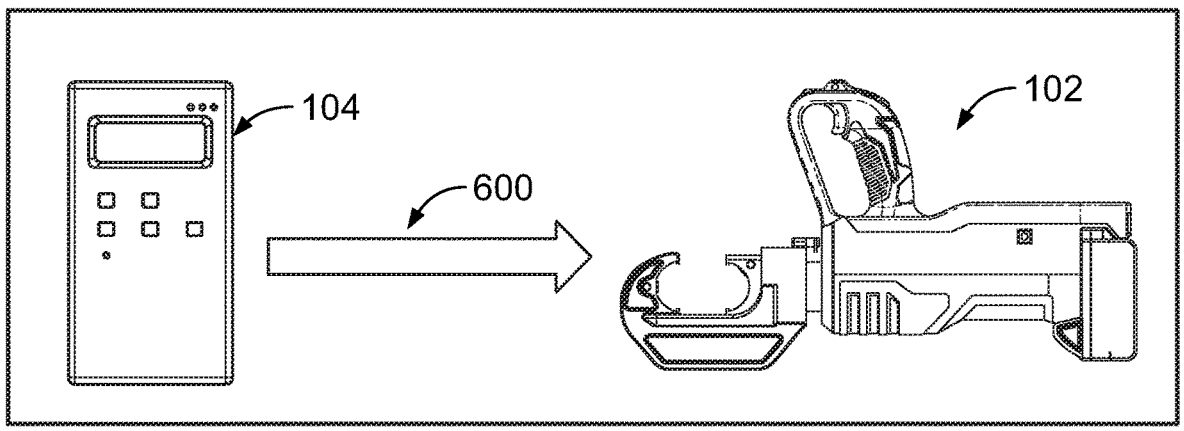

If the device 104 confirms that the operator intends to start the cutting operation by pressing both buttons 202B and 202E substantially simultaneously for a particular period of time, the device 104 sends a signal 600, as shown in FIG. 6B, to the cutting tool 102. In response to receiving the signal 600, the controller of the cutting tool 102 may turn on the switch 502 to start the cutting operation. A display of a message, e.g., "Remote Cut Starting—Cutting" may be generated on the display 204 of the device 104, as shown in FIG. 6A, to show the operator that the cutting operation started or is about to start.

In some examples, the operator may desire to stop the cutting operation before completion. For instance, a tool failure may occur, the cable may be displaced while the operation is performed, or any other event might occur that would prompt the operator to stop the ongoing cutting operation.

Figure 6C:
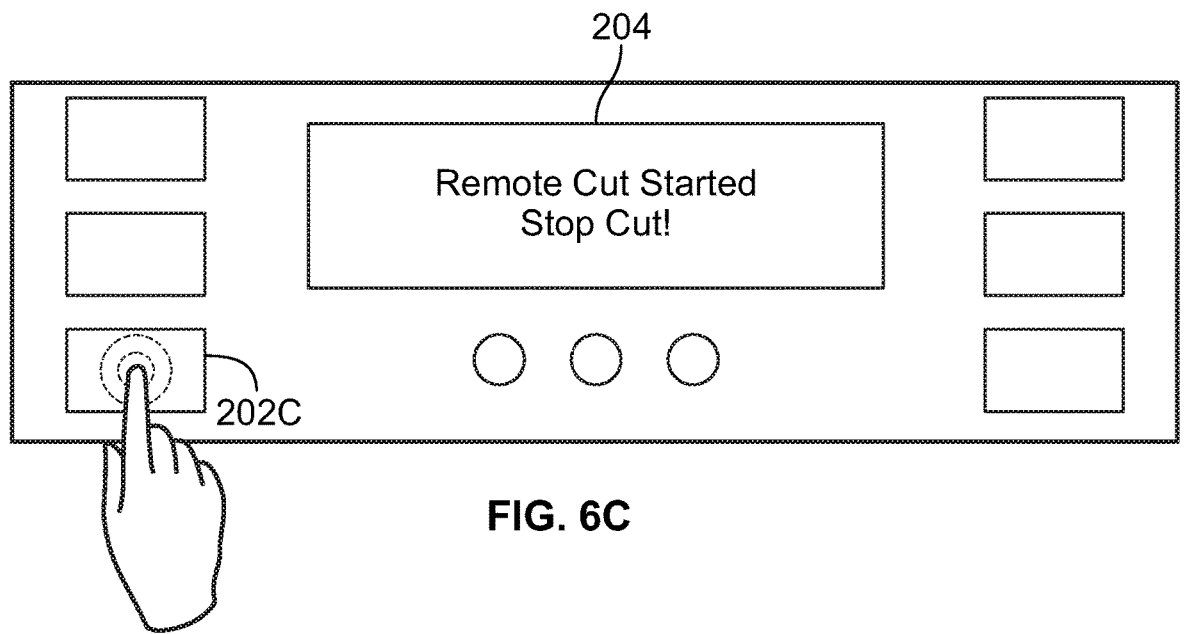
Figure 6D:
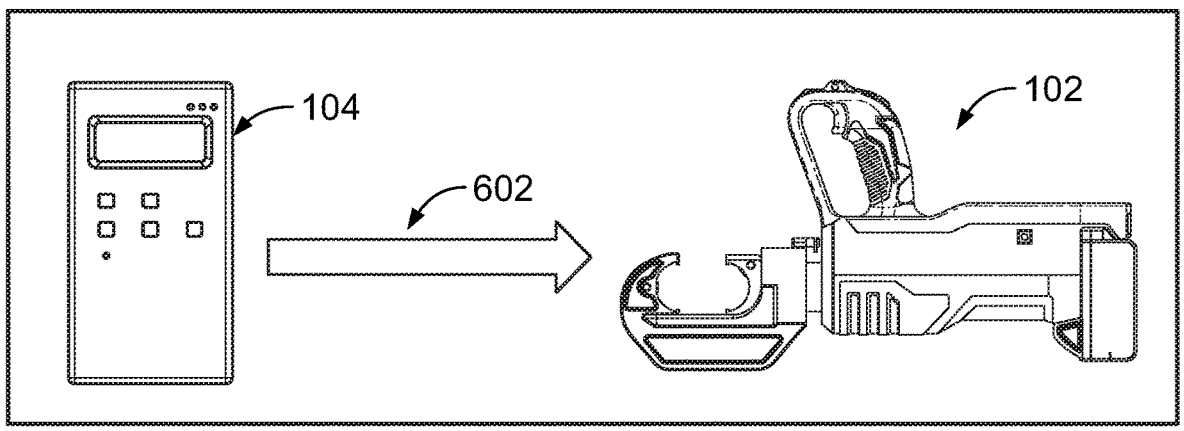

As shown in FIG. 6C, the operator may press the button 202C to indicate the operator's request to stop the cutting operation. In response, a display of a message, such as "Remote Cut Started—Stop Cut," may be generated on the display 204 as shown in FIG. 6C, to indicate the operator's request. Further, the device 104 may send a signal 602, as shown in FIG. 6D, to the cutting tool 102 commanding the controller of the cutting tool 102 to stop the cutting operation. All or a subset of the steps described above may have to be repeated to restart a remote cutting operation.

Additionally, the cutting tool 102 and the device 104 may provide the operator with a status of a cutting operation. The controller of the cutting tool 102 may receive information indicating that a cutting operation has been performed successfully. For instance, a hydraulic pressure within the cutting tool 102 may reach a threshold or target pressure value indicating that the actuator reached a limit of its travel stroke and thus the cut was successfully performed. As another example, the actuator may have a position sensor that might indicate to the controller that the actuator reached the end of its travel stroke. Other indicators are also possible.

On the other hand, the controller may also determine that a failure occurred during the cutting operation. For instance, the controller may determine or receive sensor information indicating that the actuator has stalled or that the battery 112 is overloaded, or any other event that might indicate fault with the cutting tool 102.

Figure 6E:
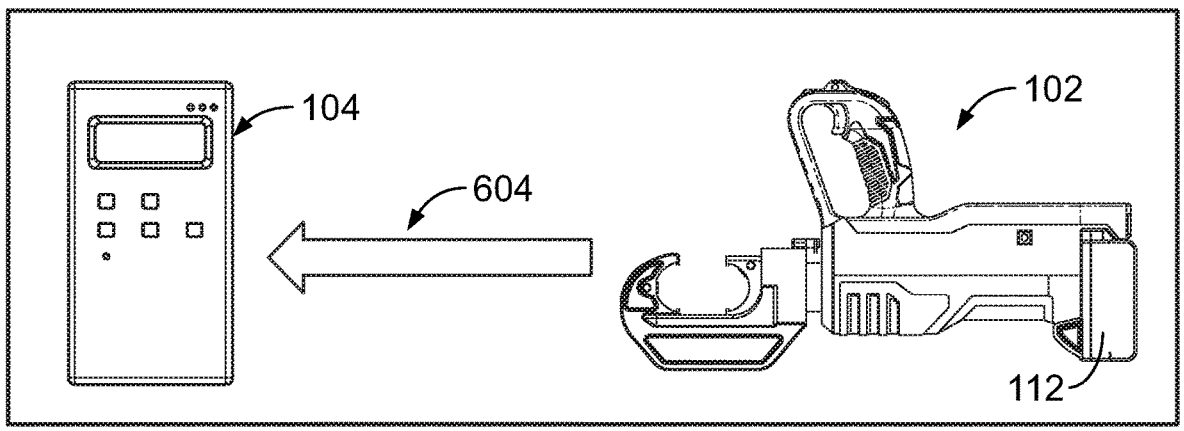
Figure 6F:
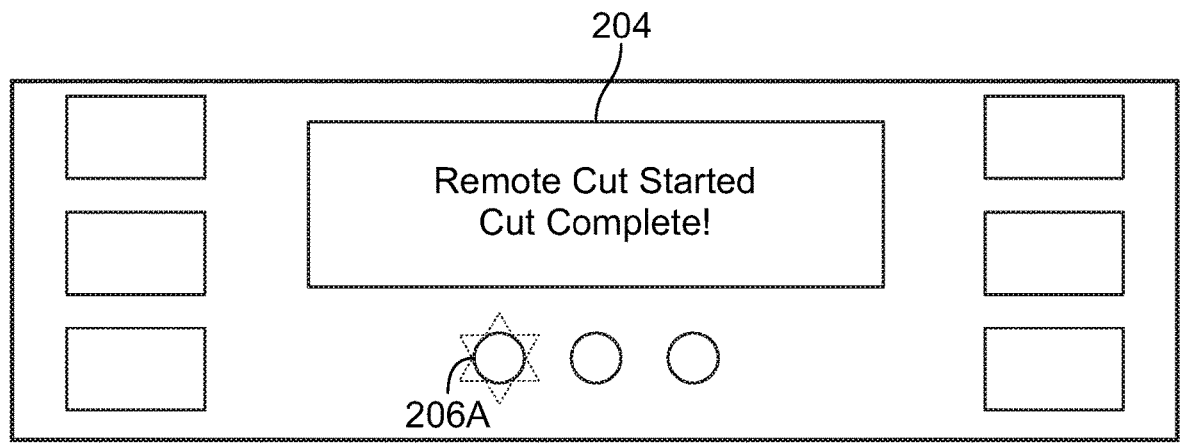

Whether the cutting operation is successful or an error has occurred, the controller of the cutting tool 102 may send a signal 604, as shown in FIG. 6E, to the device 104 to indicate the status of the cutting operation. When the device 104 receives the signal 604, the device 104 may provide indications to the operator regarding the status of the cutting operation. For instance, if the cutting operation has been successful, a display of a message "Cut Complete!" may be generated on the display 204 as shown in FIG. 6F. Further, the light indicator 206A may flash at a particular frequency with a green light to indicate success of the cutting operation.

Figure 6G:
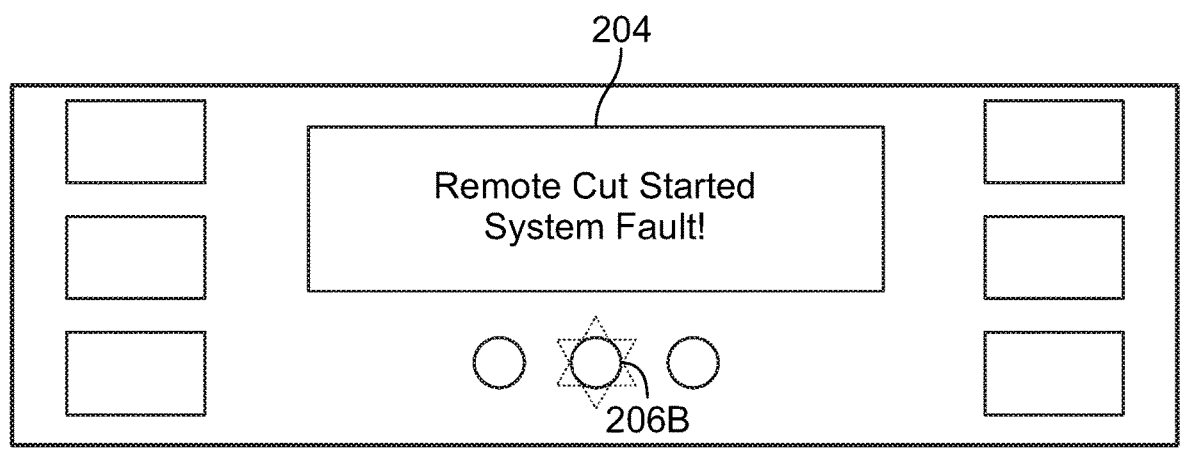

On the other hand, if a fault has occurred and the cutting operation has been stopped, a display of a message "System Fault!" may be generated on the display 204, as shown in FIG. 6G Further, the light indicator 206B may flash at a particular frequency with a red light to indicate system fault or failure of the cutting operation.

Upon completion of the cutting operation, the controller of the cutting tool 102 may cause the cutting tool 102 to switch back to the normal mode of operation. As mentioned above, in the normal mode of operation, if the operator pulls the trigger 110, the actuator of the cutting tool 102 would be powered.

Figure 7A:
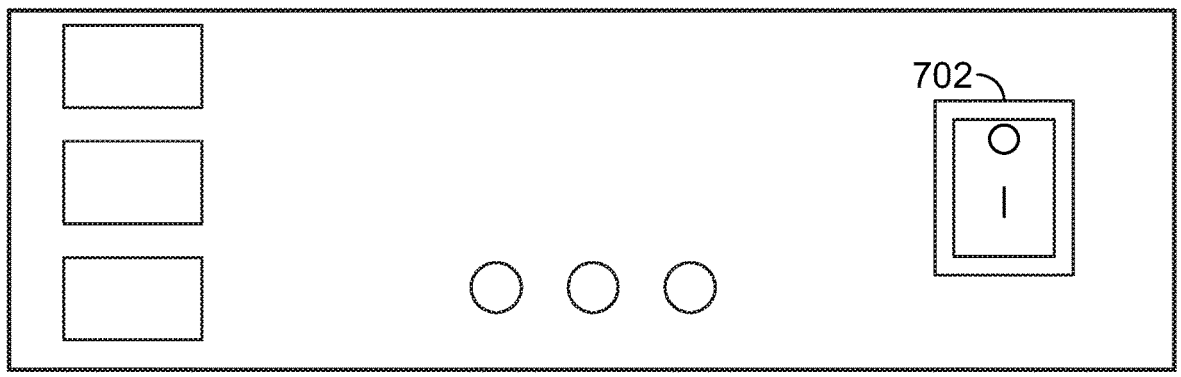
FIGS. 7A, 7B, 7C, and 7D illustrate an example procedure for enabling a remote-cut mode, in accordance with an example implementation.
Figure 7B:
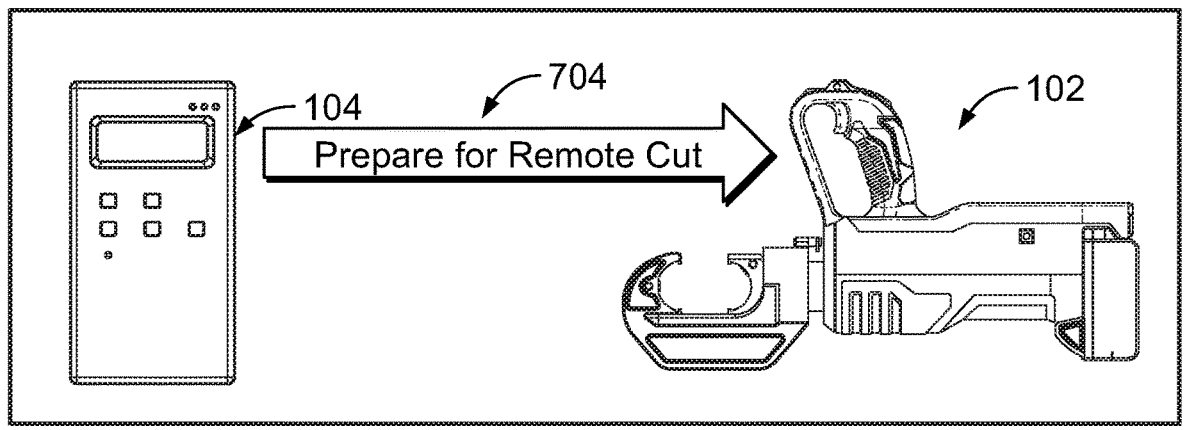

FIGS. 7A-7E illustrate another example procedure for enabling a remote-cut mode, in accordance with an example implementation. As shown in FIG. 7A, in one example embodiment, the device 104 may include a power switch 702. Enabling the remote-cut mode may initially involve toggling the power switch 702 from an "off" state to an "on" state. The power switch 702 may be a virtual or a mechanical switch. Toggling the power switch 702 from the off state to the on state may initiate establishment of a wireless connection between the device 104 and the cutting tool 102. In response, the device 104 may then establish a wireless connection with the cutting tool 102 (e.g., by searching for and associating with the cutting tool 102), and then transmit or send a signal 704 to the cutting tool 102, as shown in FIG. 7B, to command the controller of the cutting tool 102 to prepare for a remote-cut operation.

In some examples, the power switch 702 may also serve an additional function. In particular, an operator may also use the power switch 702 to immediately stop the enabling of a remote-cut operation at any time prior to performing the remote-cut. By way of example, to immediately stop the remote-cut operation, the operator may toggle the power switch 702 from the "on" state to the "off" state at any time prior to performing the remote-cut. In response, the device 104 may then transmit or send a signal to the cutting tool 102, to command the controller of the cutting tool 102 to terminate the enabling of the remote-cut mode.

After sending the signal 704 to the cutting tool 102, the operator may lock the trigger 110 and switch the cutting tool from local use to remote use. As discussed above, the cutting tool 102 may have a trigger lock 500. The operator may push the trigger lock 500 while the trigger 110 is pulled, mechanically locking the trigger 110 in the "on" state. Because the cutting tool 102 had received the signal 704 form the device 104 commanding the cutting tool 102 to prepare for the remote-cut mode, pulling the trigger 110 might not cause the actuator of the cutting tool 102 to be powered. This would indicate to the operator that communication had been properly established between the device 104 and the cutting tool 102. Alternatively, if the signal 704 was not received correctly at the cutting tool 102 due to, for example, communication faults, pulling the trigger 110 might cause the actuator to be powered. This would indicate to the operator that communication has not been established or that the procedure for enabling the remote-cut mode might not have been followed correctly.

Figure 7C:
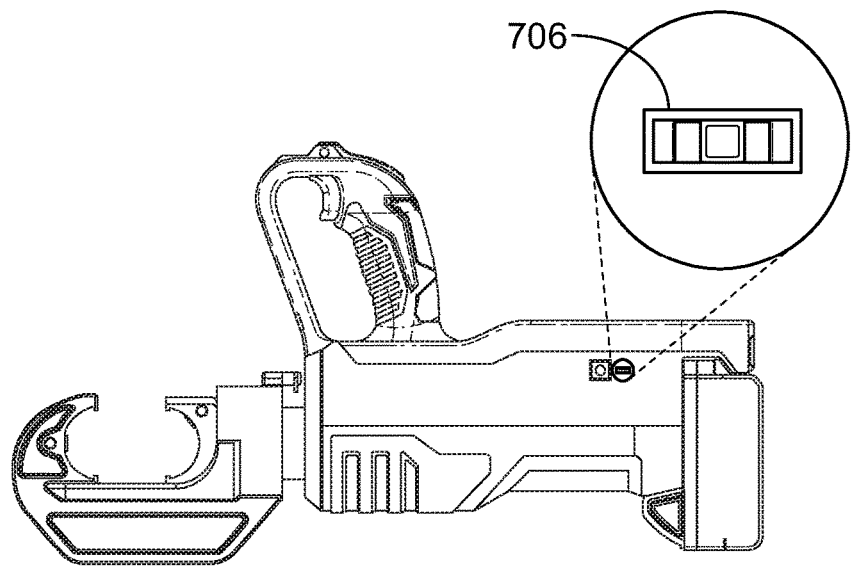

In addition, as shown in FIG. 7C the cutting tool 102 may have a remote switch 706. The operator may toggle the remote switch 706 to switch the cutting tool 102 between a normal mode (e.g., local-use-only-mode) and a remote-cut mode (e.g., remote-use-only mode). In the normal mode, the cutting tool 102 may be operated directly by an operator, using the trigger 110 of the cutting tool 102. Whereas, in the remote-cut mode, the cutting tool may be operated remotely using the device 104. Accordingly, as part of the procedure for enabling the remote-cut mode, the operator may use the remote switch 706 to place the cutting tool in the remote-cut mode.

In some examples, the remote switch 706 may serve an additional function as well. In particular, an operator may also use the remote switch 706 to stop a remote-cut operation or prevent a remote-cut operation. By way of example, to prevent or stop a remote-cut operation, the operator may toggle the remote switch 706 from the remote-cut mode to the normal mode. In response, the controller of the cutting tool 102 may enter a "lock out" state until the trigger 110 is unlocked. In the "lock out" state, actuating of the cutting tool may be disabled. When the trigger 110 is unlocked, the cutting tool 102 may then return to the normal mode.

Figure 7D:
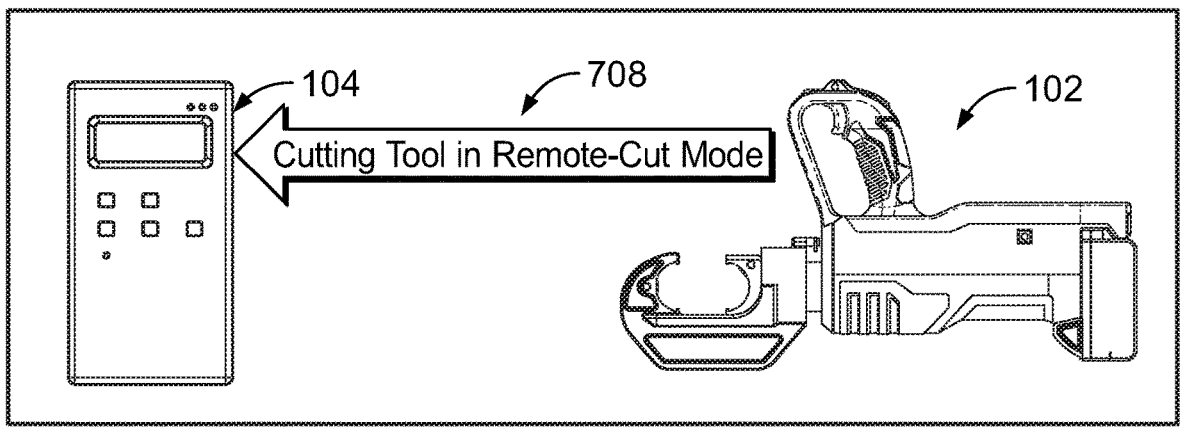

It should be noted that the order in which the operator locks the trigger 110 and switches the cutting tool 102 from normal mode to remote-cut mode might not matter. For example, an operator may first switch the cutting tool from normal mode to remote-cut mode using the remote switch 706 and then subsequently lock the trigger 110. Switching the cutting tool to remote-cut mode may cause the trigger to not cause an actuation of the two blades, so that the trigger can be locked in the "on" state. After the operator locks the trigger 110 and switches the cutting tool 102 to remote-cut mode (in any order), as shown in FIG. 7D, the controller of the cutting tool 102 may then send a signal/message 708 to the device 104, confirming that the cutting tool 102 is in the remote-cut mode.

In addition, in some examples, the operator may switch the cutting tool 102 to the remote-cut mode using the remote switch 706, and also optionally subsequently lock the trigger 110, before toggling the power switch 702 on the device 104 from an "off" state to an "on" state. Further, if the operator switches the cutting tool 102 to the remote-cut mode and then waits a while (e.g., two minutes) before toggling the power switch 702 on the device 104 from the "off" state to the "on" state, the controller of the cutting tool 102 may nevertheless "wakeup" upon detecting a signal from the device 104. By way of example, the controller 102 may "awake" after detecting a predetermined signal (e.g., a Bluetooth awake signal) from the device 104.

Additionally or alternatively, the controller of the cutting tool 102 may terminate the enabling of the remote-cut operation and enter a power-save or sleep mode if the controller of the cutting tool does not receive a signal from the device 104 within a predetermined time period (e.g., five minutes, ten minutes, etc.) of when the remote switch 706 was toggled.

In some examples, the device 104 may include a power-saving mode. By way of example, in the event that the device 104 never establishes a wireless connection with the cutting tool 102 (e.g., if the power switch 702 was inadvertently switched "on" but the cutting tool 102 is "off" or is out of range of the device 104), the device 104 may enter a power-saving mode after a predetermined time period expires. For instance, the device 104 may enter a power-saving mode after two minutes of unsuccessfully attempting to establish a connection with the cutting tool 102. Additionally or alternatively, the device 104 may enter a power-saving mode if a connection with the cutting tool 102 drops and cannot be re-established within a predetermined amount of time (e.g., two minutes). The device 104 may, for example, detect a dropped connection if a battery is removed from the cutting tool 102. Re-establishing the connection within the predetermined amount of time may restart a power-saving timer.

As still another example, in the event that the device 104 receives the signal/message 708 from the cutting tool 102 and a predetermined amount of time (e.g., two minutes) elapses without the operator proceeding to arm the cutting tool 102, the device 104 may enter the power-save mode. If the device 104 enters the power-saving mode, an operator may cycle the power switch 702 to "off" and then back to "on" to restart the enabling of the remote-cut mode.

Figure 8A:
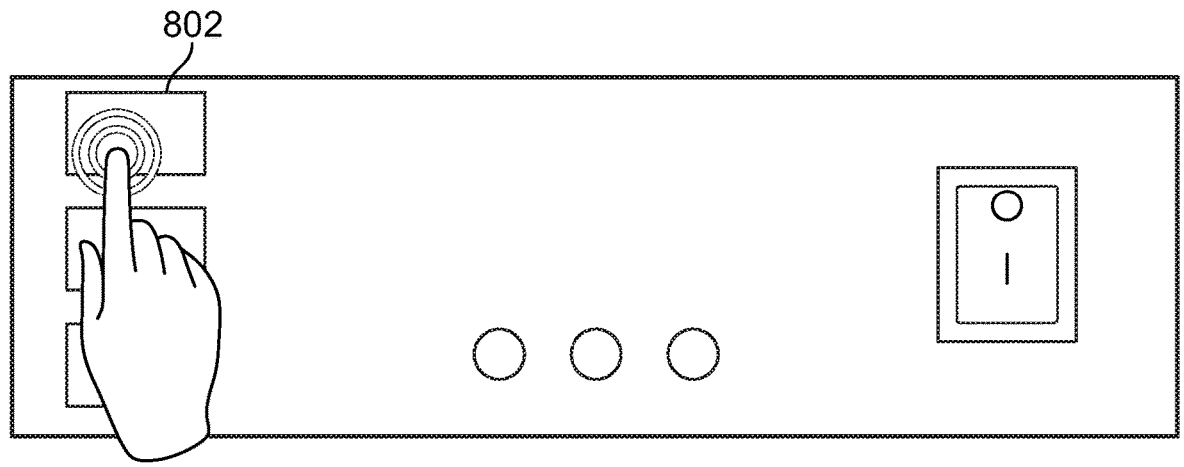
FIGS. 8A and 8B illustrate an example procedure for arming a cutting tool, in accordance with an example implementation.
Figure 8B:
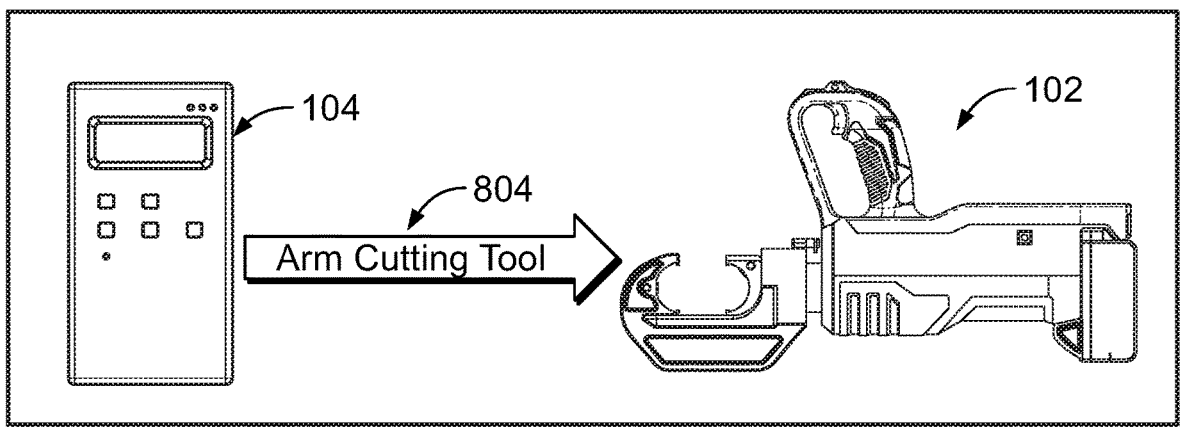

As discussed above, performing a remote-cut operation may also involve arming or readying the cutting tool 102 for the remote-cut operation. FIGS. 8A and 8B illustrate an additional example procedure for arming or readying the cutting tool 102. In one embodiment, as shown in FIG. 8A, an operator may press and hold an "arm" button 802 on the remote device 102 to confirm the operator's intent to move to the cut stage and arm the cutting tool 102. By way of example, the operator may press and hold the "arm" button 802 for a predetermined length of time (e.g., five seconds). In response, as shown in FIG. 8B, the device 104 may send or transmit a signal/message 804 to the controller of the cutting tool 102, commanding the controller to arm the cutting tool 102. Subsequently, a user may then press one (or multiple) "cut" buttons (not shown). In response, the device 104 may send or transmit a signal/message to the cutting tool 102, commanding the controller to start the remote-cut operation. In some embodiments, one or both of the device 104 and the cutting tool 102 may provide indications to the operator indicating the current operating state of the cutting tool 102. In line with discussion above, the device 104 may have a display that generates messages. Additionally or alternatively, one or both of the device 104 and the cutting tool 102 may include a speaker or audible device configured to provide audible indications of the operating state of the cutting tool 102.

As one example, the cutting tool 102 may include an audible device that is configured to provide different respective audible indications when the cutting tool 102 is attempting to establish a connection with the device 104, has established a connection with the device 104, and is armed. Similarly, the device 104 may include an audible device that is configured to provide different respective audible indications when the device 104 is attempting to establish a connection with the cutting tool 102, has established a connection with the cutting tool 102, the cutting tool 102 is armed, and a remote-cut command has been issued. Further, the device 104 may provide particular audible indications indicating whether or not a remote-cut operation was completed without error.

As another example, each of the device 104 and the cutting tool 102 may include one or more LEDs or other light sources configured to provide visual indications of the operating state of the cutting tool 102. By way of example, FIGS. 9A and 9B conceptually illustrate example visual indications that may be provided during a remote-cut procedure. In particular, FIG. 9A depicts a flow diagram 902 showing different visual indications that may be provided by the cutting tool 102 (i.e., on the "Tool Side") and by the device 104 (i.e., on the "Remote Side"). Further, FIG. 9B is a table 904 that provides an example of different respective patterns that may be provided by LEDs on the cutting tool 102 and the device 104.

As shown in FIG. 9A, the cutting tool 102 may include a single beacon (e.g., an LED or other light source) configured to provide three different beacons: Beacon #1, Beacon #2, and Beacon #3. In particular, the flow diagram 902 indicates that the beacon may be configured to provide Beacon #1 when the remote switch 706 is switched to remote-use-only mode. The beacon may also be configured to provide Beacon #2 when the trigger 110 is locked (e.g., using the trigger lock 500). Further, the beacon may be configured to provide Beacon #3 when the cutting tool 102 or when an error in a remote-cut operation occurs.

The table 904 of FIG. 9B provides examples of patterns corresponding to each of Beacon #1, Beacon #2, and Beacon #3. Specifically, in the example configuration, the pattern for Beacon #1 may be blinking at one blink per second, the pattern for Beacon #2 may be blinking at two blinks per second, and the pattern for Beacon #3 may be blinking at three blinks per second.

As further shown in FIG. 9A, the device 104 may include five LEDs: three Function LEDs and two Results LEDs. The three Function LEDs may be configured to provide five different LED patterns. In particular, the flow diagram 902 indicates that the three Function LEDs may provide Pattern

1 when the device 104 is powered on, Pattern #2 when a connection with the cutting tool 102 is established, Pattern #3 while an operator is arming the cutting tool 102, Pattern #4 when the cutting tool 102 is armed, and Pattern #5 when a remote-cut command has been issued. Further, a first one of the Results LEDs may be configured to provide an indication if a remote-cut is completed successfully and a second one of the Results LEDs may be configured to provide an indication if an error in the remote-cut operation occurs.

The table 904 of FIG. 9B provides examples of patterns corresponding to each of Pattern #1, Pattern #2, Pattern #3, Pattern #4, and Pattern #5. In addition, the table 904 provides examples of indications that may be provided by the two Results LEDs.

To enhance safety of the system described above, it is desirable to ensure exclusive one-to-one pairing between the device 104 and the cutting tool 102. In other words, the cutting tool 102 may be configured to respond only to signals received from the device 104, and thus not respond to signals from any other devices. Similarly, the device 104 may be configured to communicate exclusively with the cutting tool 102. In this manner, unintended signals from other devices would not interfere with operation of the cutting tool 102 and the device 104.

Figure 10:
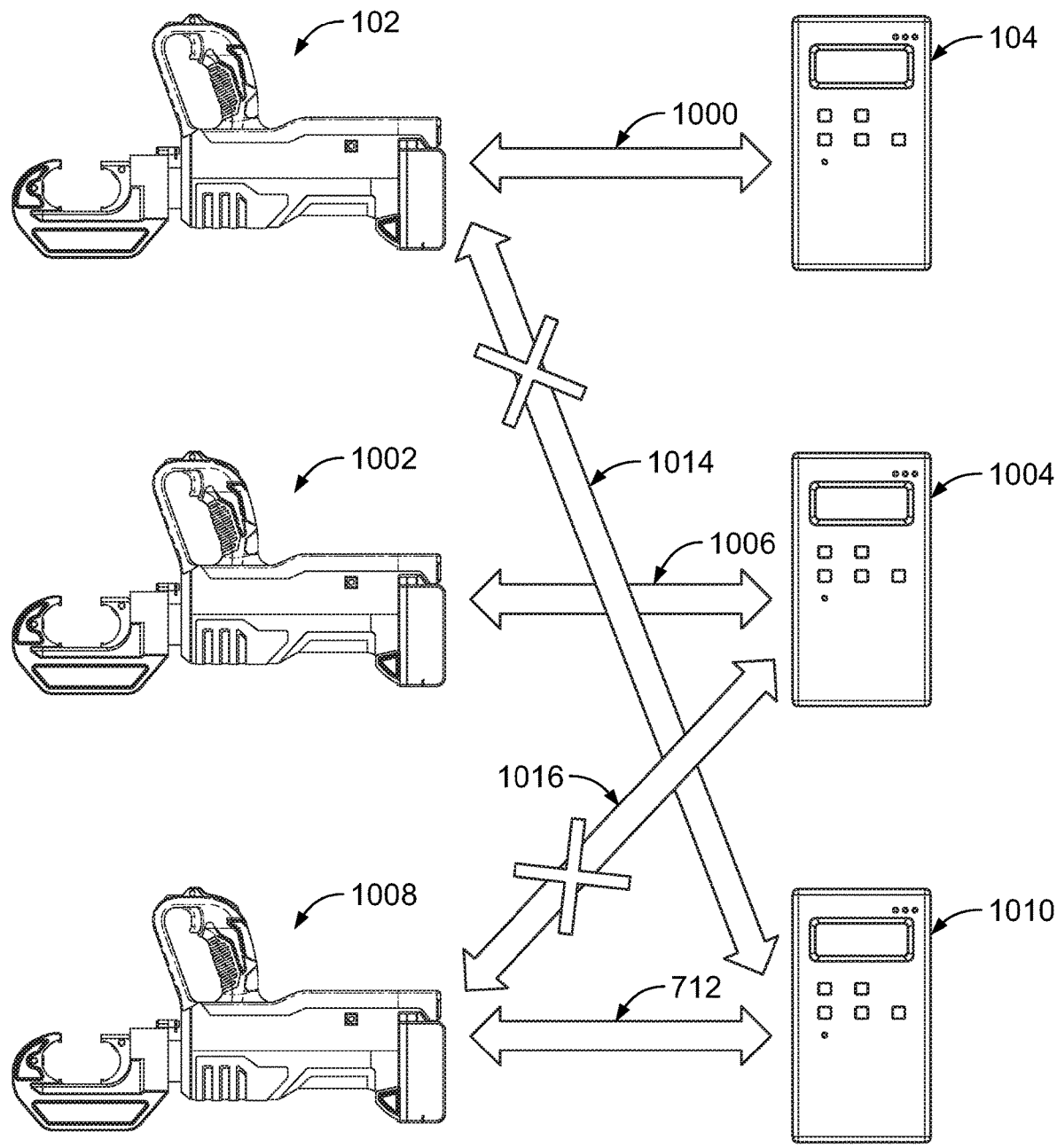
FIG. 10 illustrates exclusive one-to-one pairing between a cutting tool and a device, in accordance with an example implementation.

FIG. 10 illustrates exclusive one-to-one pairing between the cutting tool 102 and the device 104, in accordance with an example implementation. As shown in FIG. 10, the cutting tool 102 has exclusive one-to-one pairing with the device 104 via a communication channel 1000. Similarly, a cutting tool 1002 has exclusive one-to-one pairing with a device 1004 via a communication channel 1006, and a cutting tool 1008 has exclusive one-to-one pairing with a device 1010 via a communication channel 1012. However, communication channels 1014 and 1016 are not available. As such, the cutting tool 102 cannot communicate with either the device 1004 or 1010. Similarly, there are no communication channels between the device 104 and either of the cutting tools 1002 or 1008. In this manner, no unintended communications or interference can occur between unpaired cutting tools and devices, and thus system's safety is enhanced.

In an example, to ensure exclusive one-to-one pairing between the cutting tool 102 and the device 104, the cutting tool 102 may be assigned a particular communication address. Further, the device 104 may have a memory (e.g., the data storage 306) coupled to processor(s), and configured to store the particular communication address of the cutting tool 102. The device 104 may be configured to receive signals and communications in general only from a cutting tool having that stored particular communication address, i.e., the cutting tool 102. An example communication address may include a media access control (MAC) address.

Figure 11:
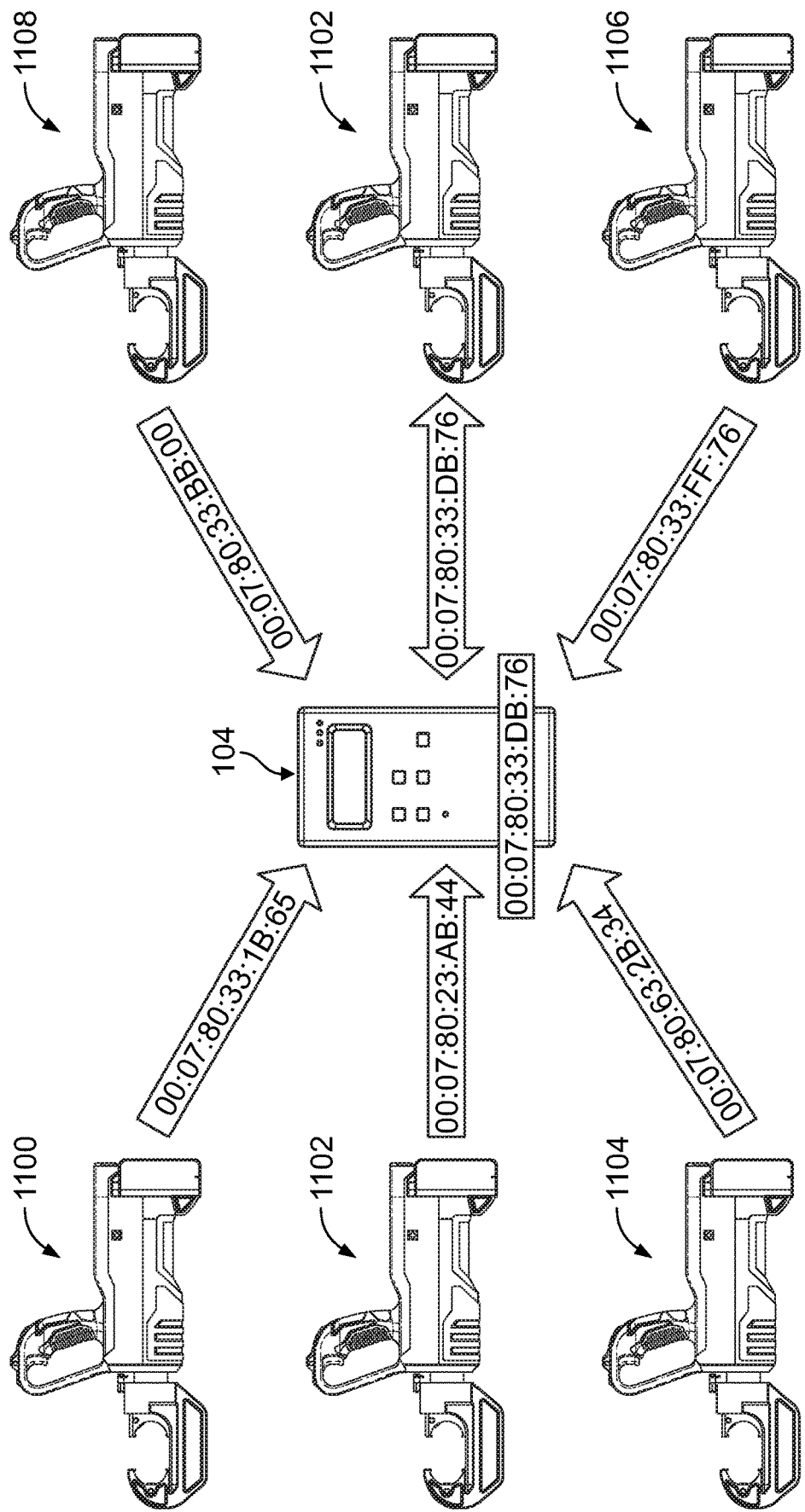
FIG. 11 illustrates a device communicating exclusively with a cutting tool, in accordance with an example implementation.

FIG. 11 illustrates the device 104 communicating exclusively with the cutting tool 102, which has a particular MAC address, in accordance with an example implementation. As shown in FIG. 11, the cutting tool 102 has a MAC address of (00:07:80:33:DB:6), which is stored in a memory of the device 104. Thus, the device 104 would exclusively receive and transmit communications to and from the cutting tool 102.

Other cutting tools are assigned different MAC addresses. Particularly, a cutting tool 1100 is assigned a MAC address (00:07:80:33:1B:65); cutting tool 1102 is assigned a MAC address (00:07:80:23:AB:44); cutting tool 1104 is assigned a MAC address (00:07:80:63:2B:34); cutting tool 1106 is assigned a MAC address (00:07:80:33:FF:76); and cutting tool 1108 is assigned a MAC address (00:07:80:33:BB:00). The device 104 would not accept any communications from the cutting tools 1100, 1102, 1104, 1106, and 1108 as their respective MAC addresses are not stored in the memory of the device 104.

Figure 12:
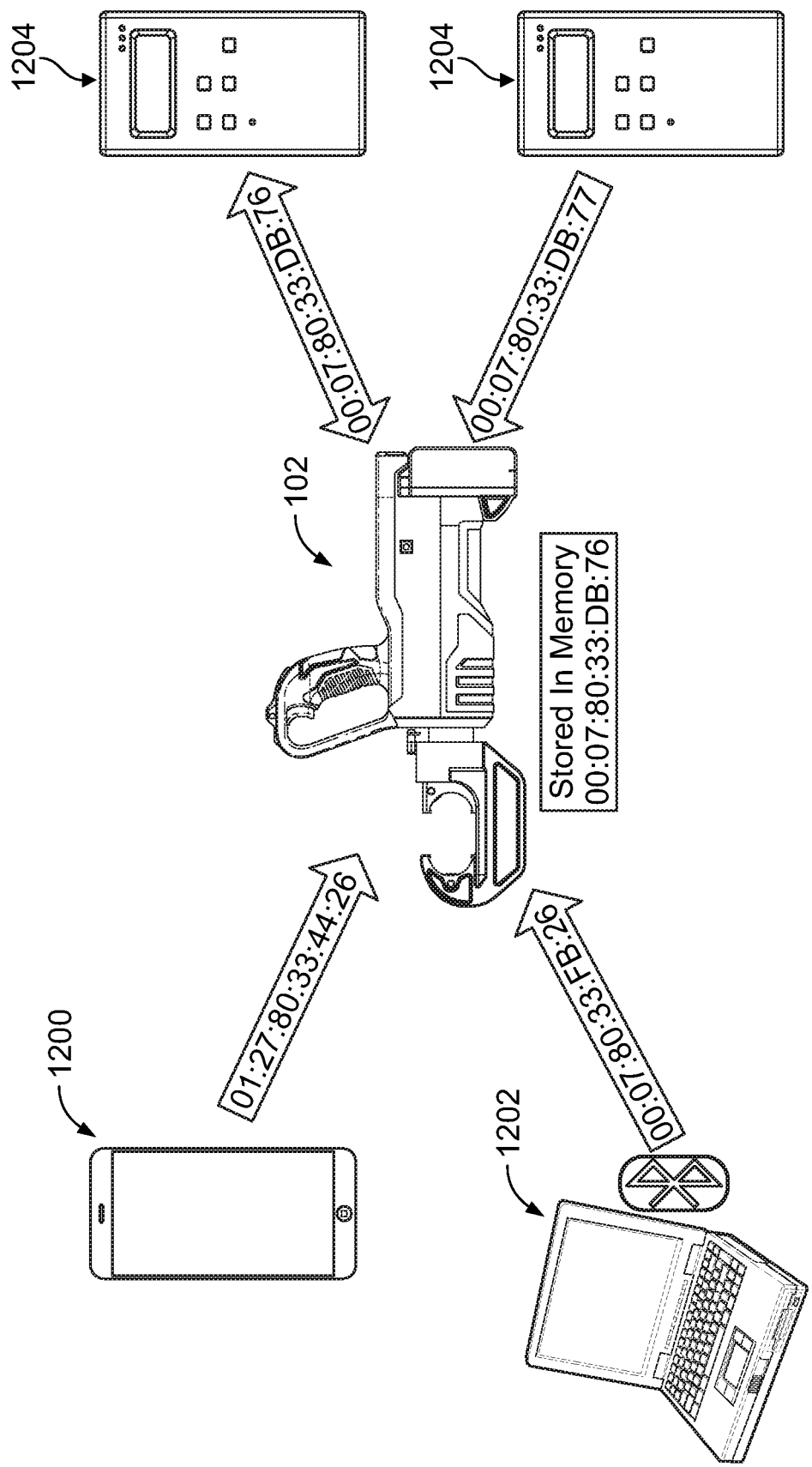
FIG. 12 illustrates a cutting tool communicating with a particular device while excluding other devices, in accordance with an example implementation.

FIG. 12 illustrates the cutting tool 102 communicating with the device 104 while excluding other devices, in accordance with an example implementation. The cutting tool 102 also has the same MAC address (00:07:80:33:DB:76) stored in its memory, and would pair only with the device 104, which is assigned the same MAC address. A device 1200 is assigned a MAC address (01:27:80:33:44:26); device 1202 is assigned a MAC address (00:07:80:33:FB:26); and device 1204 is assigned a MAC address (00:07:80:33:DB:77). The cutting tool 102 would not accept any communications from the devices 1200, 1202, and 1204 as their respective MAC addresses are not are not stored in the memory of the cutting tool 102.

III. EXAMPLE METHODS

Figure 13:
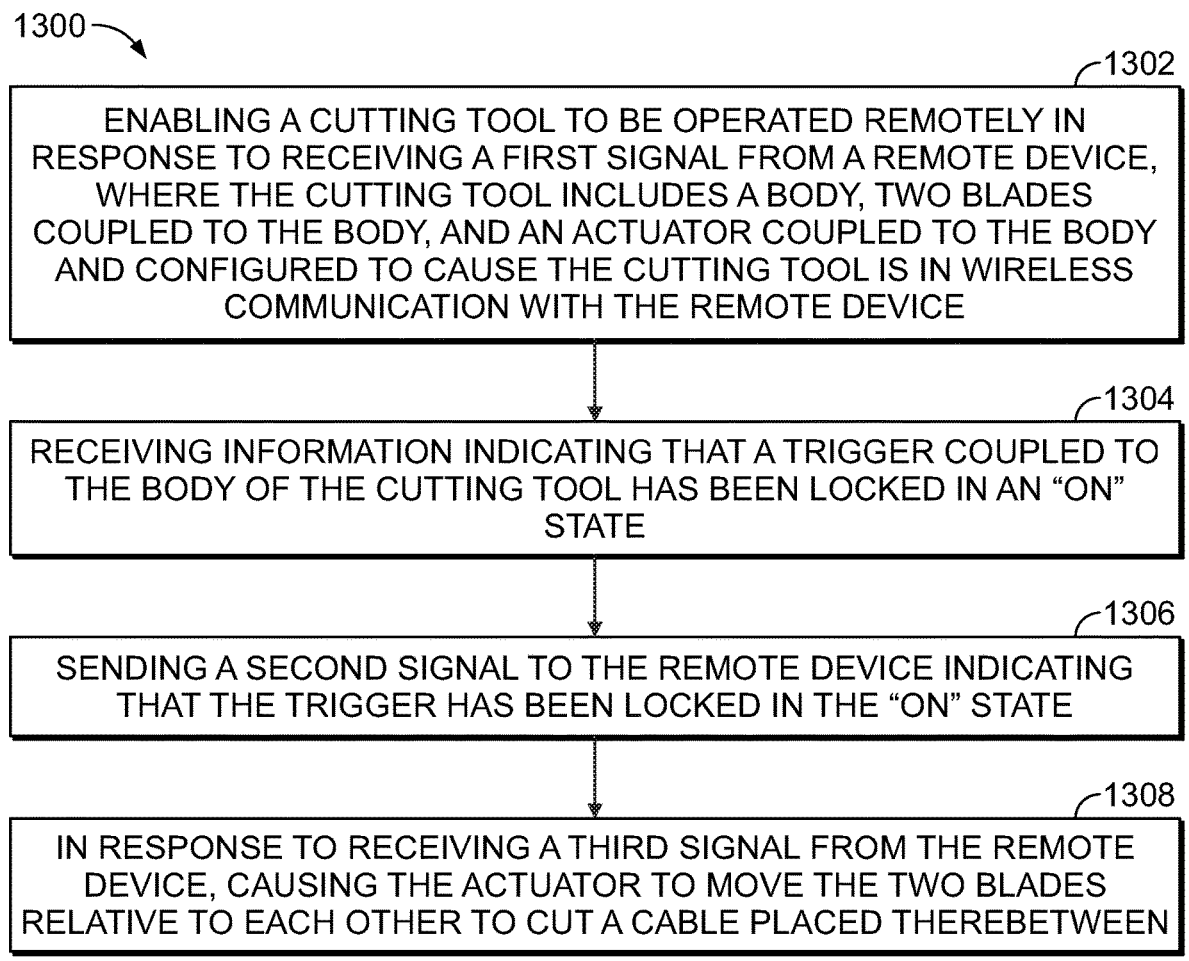
FIG. 13 is a flow chart, in accordance with an example implementation.

FIG. 13 is a flow chart 1300, in accordance with an example implementation. The flow chart 1300 may include one or more operations, or actions as illustrated by one or more of blocks 1302-1308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1300 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1300 and other processes and operations disclosed herein, one or more blocks in FIG. 13 may represent circuitry or digital logic that is arranged to perform the specific logical operations in the process.

The operations of the flow chart 1300 may be implemented by, for example, the controller of the cutting tool 102 as described above.

At block 1302, the flow chart 1300 includes enabling a cutting tool to be operated remotely in response to receiving a first signal from a remote device. In line with the discussion above, a cutting tool (e.g., the cutting tool 102) includes a body, two blades coupled to the body, and an actuator coupled to the body and configured to cause the two blades to move relative to each other. The cutting tool is in wireless communication with a remote device (e.g., the device 104). For instance, the cutting tool, or a controller of the cutting tool, may be in communication via a wireless protocol such as Bluetooth with the remote device.

The cutting tool may be configured to operate in at least two operating modes: a normal mode and a remote-cut mode. In the normal mode, an operator may place a cable between the blades and pull a trigger causing the actuator to move the blades relative to each other and cut the cable. In the remote-cut mode, however, the cutting tool may be remotely controlled via the remote device.

The controller may enable the cutting tool to operate in the remote-cut mode in response to one or more signals from the device. For instance, an operator may press a button (e.g., the button 202A) of a user interface of the device to initiate operating the cutting tool remotely. This first press may be considered by the device as a first enabling criterion. The device may request or wait for a second press on a second button (e.g., the button 202D) within a threshold period of time from the first press to confirm that the operator intends to operate the cutting tool remotely. The second press is considered as a second enabling criterion. In response to both the first and second enabling criteria, the device may send a signal (e.g., the signal 400) to the cutting tool to inform the controller of the cutting tool to prepare for operating remotely.

To emphasize safety, the controller may not place the cutting tool in a remote-cut mode until the controller receives a third enabling criterion. For instance, the operator may be requested to press on a trigger (e.g., the trigger 110) coupled to the cutting tool to confirm the operator's intention to operate the cutting tool remotely. Once the controller receives an indication of this third enabling criterion, the controller enables the cutting tool to operate in a remote-cut mode. The controller may further send a signal (e.g., the signal 402) to inform the device that the cutting tool is now operating in a remote-cut mode.

The cutting tool may further have a light indicator. The controller may cause the light indicator to flash at a particular frequency to alert the operator that the cutting tool is now operating in a remote-cut mode.

At block 1304, the flow chart 1300 includes receiving information indicating that a trigger coupled to the body of the cutting tool has been locked in an "on" state. After enabling the cutting tool to be operated remotely, the next step is to arm or ready the cutting tool to perform a cutting operation. As an example, the operator may lock the trigger in an "on" state to arm the cutting tool. For instance, the cutting tool may have a trigger locking mechanism (e.g., the trigger lock 500) that enables locking the trigger in the "on" state.

At block 1306, the flow chart 1300 includes sending a second signal to the remote device indicating that the trigger has been locked in the "on" state. The controller may receive an indication that the trigger is locked in the "on" state, and in response send a signal (the signal 506) to the remote device to inform it that the trigger has been locked in the "on" state. This signal further informs the remote device that the cutting tool is armed and ready to perform the cutting operation.

At block 1308, the flow chart 1300 includes, in response to receiving a third signal from the remote device, causing the actuator to move the two blades relative to each other to cut a cable placed therebetween. The operator may press one or more buttons (e.g., the buttons 202B and 202E) to starting the cutting operation. Responsively, the device sends a signal (e.g., the signal 600) to the cutting tool. When the controller of the cutting tool receives an indication of this signal. The controller commands the cutting tool to start the cutting operation. For instance, the controller provides power to an actuation mechanism that drives the actuator and causes the blades to move relative to each other and cut a cable placed therebetween.

Further, if the operator desires to stop the cutting operation for any reason, the operator may press a button (e.g., the button 202C) and the device may send another signal (e.g., the signal 602) to the cutting tool. The controller stops the cutting tool in response to receiving such signal. The controller may also send one or more signals during the cutting operation to inform the device, and thus the operator, about the status of the cutting operation, e.g., whether the cutting operation is successful or a fault has occurred.

Figure 14:
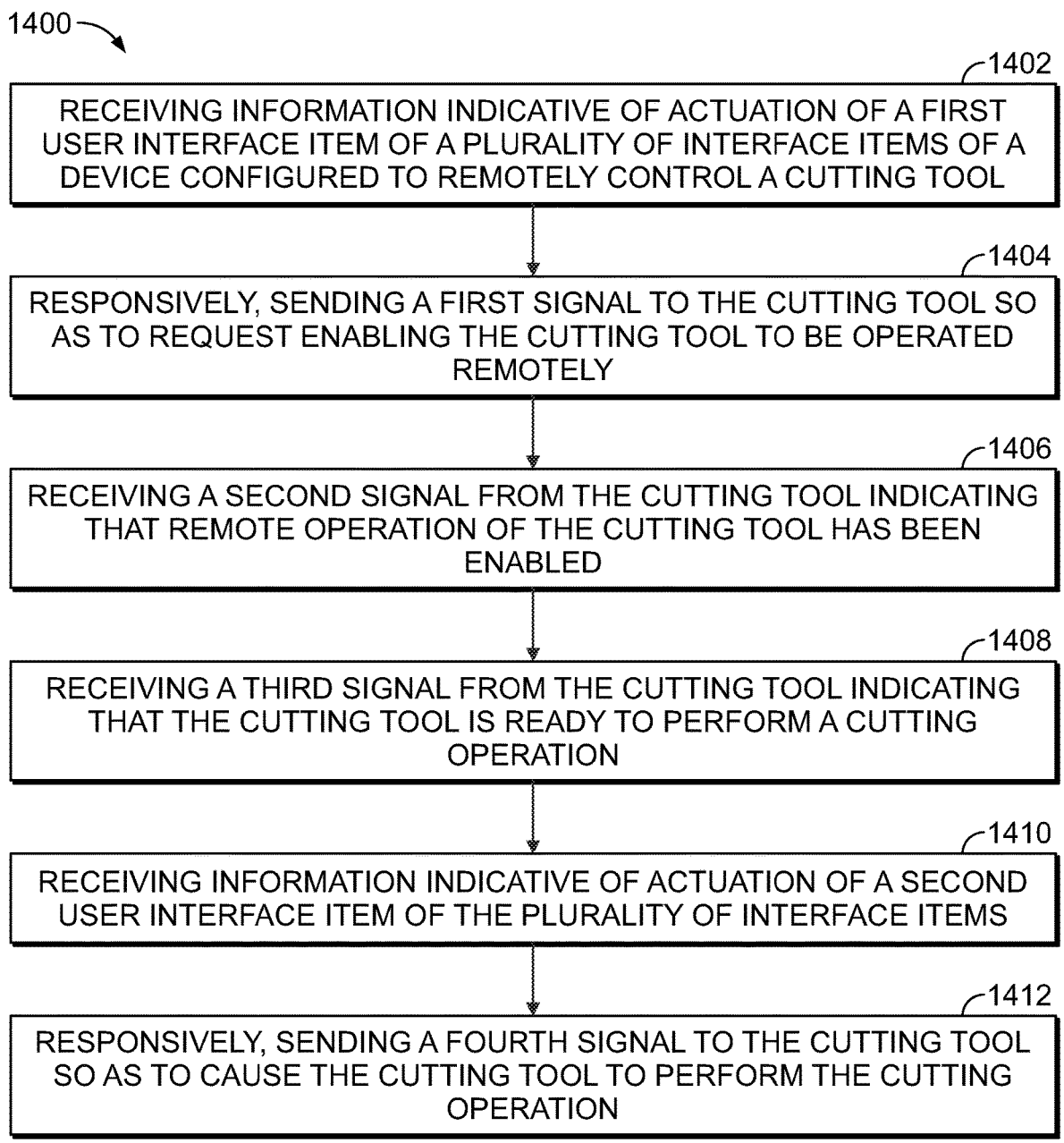
FIG. 14 is another flow chart, in accordance with an example implementation.

FIG. 14 is another flow chart 1400, in accordance with an example implementation. The flow chart 1400 may include one or more operations, or actions as illustrated by one or more of blocks 1402-1412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1400 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1400 and other processes and operations disclosed herein, one or more blocks in FIG. 14 may represent circuitry or digital logic that is arranged to perform the specific logical operations in the process.

The operations of the flow chart 1400 may be implemented by, for example, the device 104 (or a processing unit of the device 104) as described above.

At block 1402, the flow chart 1400 includes receiving information indicative of actuation of a first user interface item of a plurality of interface items of a device configured to remotely control a cutting tool. A device such as the device 104 may have an interface (e.g., the user interface 200) having buttons, indicators, and a display. An operator may press one or more buttons (e.g., the buttons 202A and 202D) to activate a remote-cut mode of a cutting tool (e.g., the cutting tool 102). The processing unit of the device may then receive an indication that the operator pressed the buttons.

At block 1404, the flow chart 1400 includes responsively, sending a first signal to the cutting tool so as to request enabling the cutting tool to be operated remotely. In response to receiving the information indicating that the operator pressed the button(s), the device may then send a signal (e.g., the signal 400) to the cutting tool requesting that the cutting tool be enabled to be operated remotely.

At block 1406, the flow chart 1400 includes receiving a second signal from the cutting tool indicating that remote operation of the cutting tool has been enabled. After a controller of the cutting tool receives the first signal, the controller may further receive another indication or confirmation that the operator desires to operate the cutting tool in the remote-cut mode. The confirmation may include, for example, the operator pulling a trigger of the cutting tool. The controller then sends a second signal (e.g., the signal 402) to the device to confirm that the remote-cut mode has been enabled for the cutting tool. The processing unit of the device may generate a display of a message on a display of the device that the remote-cut mode is enabled.

At block 1408, the flow chart 1400 includes receiving a third signal from the cutting tool indicating that the cutting tool is ready to perform a cutting operation. After enabling the remote-cut model, the operator may arm or ready the cutting tool for a cutting operation. For instance, the operator may lock a trigger of the cutting tool in an "on" state. Then, the controller may send a signal (e.g., the signal 506) to inform the device that the cutting tool is armed and ready to perform the cutting operation. The processing unit of the device may generate a display of a message on a display of the device that the cutting tool is armed.

At block 1410, the flow chart 1400 includes receiving information indicative of actuation of a second user interface item of the plurality of interface items. Once the operator sees a message or is informed that the cutting tool is armed, the operator may select or actuate a user interface item (press the buttons 202B and 202E) to command starting the cutting operation. The processing unit of the device receives an indication that the operator selected the user interface item.

At block 1412, the flow chart 1400 includes, responsively, sending a fourth signal to the cutting tool so as to cause the cutting tool to perform the cutting operation. In response to receiving an indication that the operator commanded starting the cutting operation, the device sends a signal (e.g., the signal 600) commanding the cutting tool to starting the cutting operation. The device may thereafter receive signals from the cutting tool 102 regarding status of the cutting operation, i.e., whether the cutting operation is successful or a fault has occurred.

Figure 15:
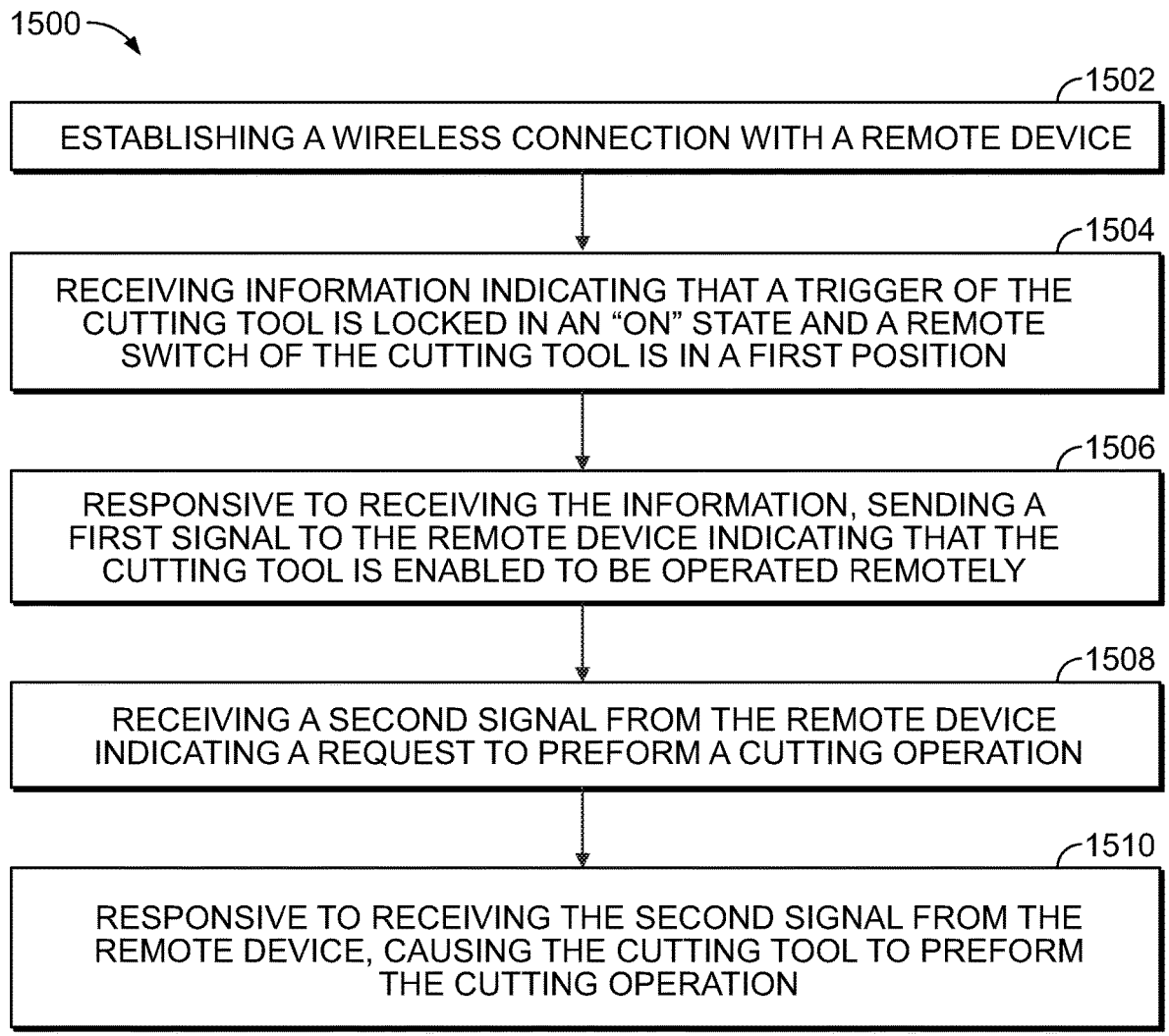
FIG. 15 is another flow chart, in accordance with an example implementation.

FIG. 15 is a flow chart 1500, in accordance with an example implementation. The flow chart 1500 may include one or more operations, or actions as illustrated by one or more of blocks 1502-1510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

The operations of the flow chart 1500 may be implemented by, for example, the controller of the cutting tool 102 as described above.

At block 1502, the flow chart 1500 includes establishing a wireless connection with a remote device. In line with the discussion above, a controller of the cutting tool may establish a wireless connection with the remote device using, for example, a Bluetooth communication protocol.

At block 1504, the flow chart 1500 includes receiving information indicating that a trigger of the cutting tool is locked in an "on" state and a remote switch of the cutting tool is in a first position. As discussed above, an operator may switch the cutting tool to a remote-cutting mode using a remote switch coupled to the body of the cutting tool and lock the trigger using a trigger lock switch coupled to the body, in any order.

At block 1506, the flow chart 1500 includes responsive to receiving the information, sending a first signal to the remote device indicating that the cutting tool is enabled to be operated remotely. At block 1508, the flow chart 1500 includes receiving a second signal from the remote device indicating a request to perform a cutting operation. And at block 1510, the flow chart 1500 includes responsive to receiving the second signal from the remote device, causing the cutting tool to perform the cutting operation. For example, the controller of the cutting tool may cause the actuator to move two blades of the cutting tool relative to each other.

Figure 16:
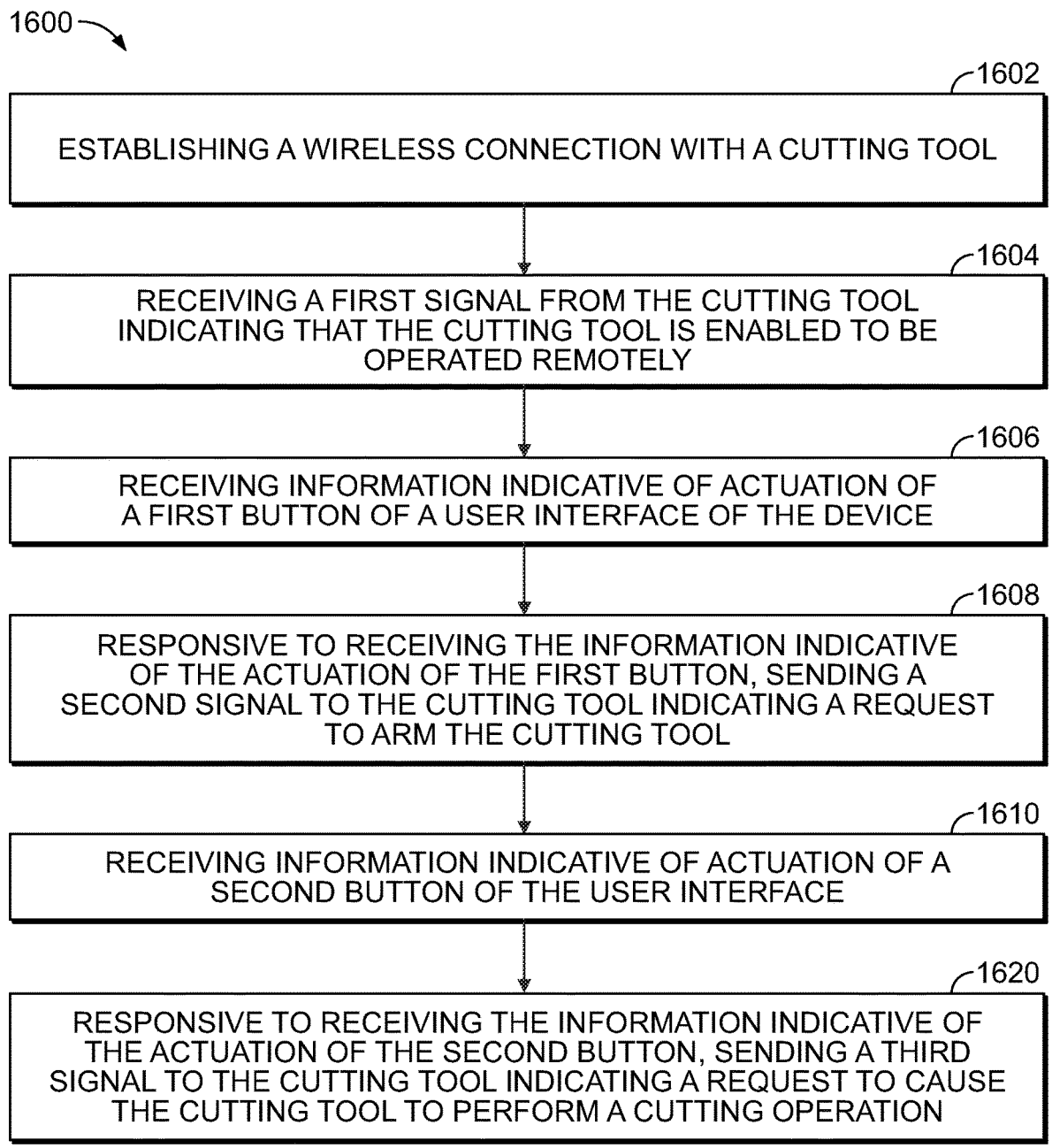
FIG. 16 is still another flow chart, in accordance with an example implementation.

FIG. 16 is another flow chart 1600, in accordance with an example implementation. The flow chart 1600 may include one or more operations, or actions as illustrated by one or more of blocks 1602-1612. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

The operations of the flow chart 1600 may be implemented by, for example, the device 104 (or a processing unit of the device 104) as described above.

As shown in FIG. 16, at block 1602, the flow chart 1600 includes establishing a wireless connection with a cutting tool. In line with the discussion above, an operator of the device may toggle a power switch to an "on" state to trigger the device to establish a wireless connection with the cutting tool.

At block 1604, the flow chart 1600 includes receiving a first signal from the cutting tool indicating that the cutting tool is enabled to be operated remotely. In line with the discussion above, an operator may place the cutting tool in a remote-cutting mode using a remote switch and lock the trigger of the cutting tool using a trigger lock switch. A controller of the cutting tool may then send a signal to the cutting tool indicating that the cutting tool is ready to perform a remote-cutting operation.

At block 1606, the flow chart 1600 includes receiving information indicative of actuation of a first button of a user interface of the device. By way of example, an operator may press and hold an "arm" button or other user-interface item on the user interface for a predetermined amount of time, and the user interface may send a signal to a processor of the device indicating that the arm button has been actuated.

At block 1608, the flow chart 1600 includes responsive to receiving the information indicative of the actuation of the first button, sending a second signal to the cutting tool indicating a request to arm the cutting tool.

At block 1610, the flow chart 1600 includes receiving information indicative of actuation of a second button of the user interface. By way of example, an operator may press a "cut" button or other user-interface item on the user interface.

And at block 1612, the flow chart 1600 includes responsive to receiving the information indicative of the actuation of the second button, sending a third signal to the cutting tool indicating a request to cause the cutting tool to perform a cutting operation.

IV. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system comprising:
    a cutting tool configured to perform a cutting operation, the cutting tool including a remote button coupled to a body of the cutting tool and configured to be toggled between at least a first position and a second position; and
    a device configured to remotely control the cutting tool, the device including
        a user interface comprising a first button and a second button;
        a power switch;
        at least one processor; and
        data storage comprising instructions that, when executed by the at least one processor, cause the device to perform operations comprising:
            receiving information indicative that the power switch is switched from an "off" state to an "on" state,
            responsive to receiving the information indicative that the power switch is switched from the "off" state to the "on" state, establishing a wireless connection with the cutting tool,
            receiving a first wireless signal from the cutting tool indicating that the cutting tool is enabled to be operated remotely, which is based on the remote button of the cutting tool having been toggled from a normal mode to a remote-cut mode,
            receiving information indicative of actuation of the first button,
            responsive to receiving the information indicative of the actuation of the first button, sending a second wireless signal to the cutting tool indicating a request to arm the cutting tool,
            receiving information indicative of actuation of the second button, and
            responsive to receiving the information indicative of the actuation of the second button, sending a third wireless signal to the cutting tool indicating a request to cause the cutting tool to perform a cutting operation.

2. The system of claim 1, wherein the operations further comprise sending the third wireless signal to the cutting tool indicating the request to cause the cutting tool to perform the cutting operation responsive to receiving the information indicative of the actuation of the second button within a non-zero finite time period of receiving the information indicative of the actuation of the first button, wherein the cutting tool is disarmed responsive to the non-zero finite time period lapsing prior to receiving the information indicative of the actuation of the first button.

3. The system of claim 2, wherein the non-zero finite time period is five seconds.

4. The system of claim 2, wherein the non-zero finite time period is ten seconds.

5. The system of claim 2, wherein the non-zero finite time period is two minutes.

6. The system of claim 1, further comprising at least one function light source.

7. The system of claim 6, wherein the operations further comprise causing the at least one function light source to provide an indication indicating that the device is attempting to establish the wireless connection with the cutting tool responsive to receiving the information indicative that the power switch is switched from the "off" state to the "on" state.

8. The system of claim 6, wherein the operations further comprise causing the at least one function light source to provide an indication indicating that the device has established the wireless connection with the cutting tool responsive to establishing the wireless connection with the cutting tool.

9. The system of claim 6, wherein the operations further comprise causing the at least one function light source to provide an indication indicating that the cutting tool is enabled to be operated remotely responsive to receiving the first signal from the cutting tool.

10. The system of claim 6, wherein the operations further comprise causing the at least one function light source to provide an indication indicating that the cutting tool is armed responsive to receiving the information indicative of the actuation of the first button.

11. The system of claim 1, wherein the device further comprises at least one result light source configured to provide one or more indications indicative of whether the cutting operation was performed without error.

12. The system of claim 1, further comprising a plurality of light sources, and wherein the at least one processor is further configured to:
    cause the plurality of light sources to emit light according to a first pattern, based on the device having been powered on;
    cause the plurality of light sources to emit light according to a second pattern different from the first pattern, based on the device having established the wireless connection with the cutting tool; and
    cause the plurality of light sources to emit light according to a third pattern different from the first and second patterns, while an operator is arming the cutting tool.

13. The system of claim 12, wherein the at least one processor is further configured to:
    transmit a fourth signal to the cutting tool thereby causing the cutting tool to perform the cutting operation, based on receiving the information indicative of actuation of the second button.

14. The system of claim 13, wherein the at least one processor is further configured to:
    cause the plurality of light sources to emit light according to a fourth pattern different from the first, second, and third patterns, based on the device having received the third wireless signal indicating that the tool is armed and is ready to perform a cutting operation; and cause the plurality of light sources to emit light according to a fifth pattern different from the first, second, third, and fourth patterns, based on the device transmitting the fourth signal to the cutting tool to cause the cutting tool to perform the cutting operation.

15. The system of claim 14, wherein the plurality of light sources are function light sources, and further comprising a first result light source, and a second result light source, and wherein the at least one processor is further configured to:

cause the first result light source to emit light, based on the device having received an indication from the cutting tool that the cutting operation was successful; and cause the second light source to emit light, based on the device having received an indication from the cutting tool that there was an error in the cutting operation.

16. The system of claim 1, wherein establishing the wireless connection is established according to a Bluetooth wireless communication protocol.

\* \* \* \* \*